United States Patent
Patton et al.

(10) Patent No.: US 10,423,688 B1
(45) Date of Patent: Sep. 24, 2019

(54) NOTIFYING ENTITIES OF RELEVANT EVENTS

(71) Applicant: Banjo, Inc., Park City, UT (US)

(72) Inventors: Damien Patton, Park City, UT (US); KW Justin Leung, Redwood City, CA (US); Rish Mehta, Redwood City, CA (US); Corey Hart, Redwood City, CA (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/353,212

(22) Filed: Mar. 14, 2019

Related U.S. Application Data

(60) Provisional application No. 62/657,695, filed on Apr. 13, 2018, provisional application No. 62/657,705, filed on Apr. 13, 2018, provisional application No. 62/660,934, filed on Apr. 20, 2018, provisional application No. 62/660,924, filed on Apr. 20, 2018, provisional application No. 62/660,929, filed on Apr. 20, 2018, provisional application No. 62/664,001, filed on Apr. 27, 2018, provisional application No. 62/667,616, filed on May 7, 2018, provisional application No. 62/669,540, filed on May 10, 2018, (Continued)

(51) Int. Cl.
  *G06F 7/00* (2006.01)
  *G06F 17/30* (2006.01)
  *G06F 16/9535* (2019.01)

(52) U.S. Cl.
  CPC .............................. *G06F 16/9535* (2019.01)

(58) Field of Classification Search
  None
  See application file for complete search history.

(56) References Cited

U.S. PATENT DOCUMENTS

| 8,782,041 | B1 | 7/2014 | Daniel |
| 8,830,054 | B2 | 9/2014 | Weiss |
| 9,159,030 | B1 | 10/2015 | Maennel |

(Continued)

OTHER PUBLICATIONS

U.S. Appl. No. 16/394,620, Non Final Office Action dated Jun. 12, 2019, 25 pages.

(Continued)

*Primary Examiner* — Tuan A Pham
(74) *Attorney, Agent, or Firm* — Michael B. Dodd; R. Jace Hirschi

(57) ABSTRACT

The present invention extends to methods, systems, and computer program products for notifying entities of relevant events. An event feed containing a plurality of events is received. Each event includes an event location, an event category, an event an event truthfulness, an event severity, and an event time. Entity notification preferences defining events relevant to an entity are accessed. Location and distance preferences collectively define an interest in events within a specified distance of one or more locations. The time preferences define that event notification occur at least within a specified time period of event detection. For an event in the event feed, characteristics of the event are compared to the entity notification preferences. It is determined that the event satisfies the entity notification preferences based on the comparisons. The entity (or another entity) is notified of the event in compliance with the time preferences.

16 Claims, 23 Drawing Sheets

Figure 1B

Related U.S. Application Data provisional application No. 62/686,791, filed on Jun. 19, 2018.

(56) References Cited

U.S. PATENT DOCUMENTS

| | | | |
|---|---|---|---|
| 9,215,252 | B2 | 12/2015 | Smith |
| 9,443,002 | B1 | 9/2016 | Freese |
| 9,727,882 | B1 | 8/2017 | Huntwork |
| 9,894,169 | B2 | 2/2018 | Sheinfeld |
| 10,057,349 | B2 | 8/2018 | Kodner et al. |
| 10,212,572 | B1 | 2/2019 | Patton et al. |
| 10,257,058 | B1 | 4/2019 | Leung et al. |
| 10,261,846 | B1 | 4/2019 | Patton et al. |
| 10,268,642 | B1 | 4/2019 | Leung |
| 10,268,660 | B1 | 4/2019 | Arazi |
| 2002/0154178 | A1* | 10/2002 | Barnett ............ G06Q 10/06314 715/853 |
| 2006/0235833 | A1 | 10/2006 | Smith et al. |
| 2011/0211737 | A1 | 9/2011 | Krupka |
| 2011/0224807 | A1* | 9/2011 | Murakanni ......... H04L 12/2827 700/21 |
| 2012/0131139 | A1 | 5/2012 | Siripurapu |
| 2013/0018896 | A1 | 1/2013 | Fleischman |
| 2013/0166385 | A1* | 6/2013 | Russell ............. G06F 16/9535 705/14.58 |
| 2013/0214925 | A1 | 8/2013 | Weiss |
| 2013/0222133 | A1* | 8/2013 | Schultz ................ G08G 1/205 340/539.13 |
| 2014/0067951 | A1 | 3/2014 | Sheinfeld |
| 2014/0085328 | A1 | 3/2014 | Codella |
| 2014/0095425 | A1 | 4/2014 | Sipple |
| 2014/0295885 | A1 | 10/2014 | Marko |
| 2014/0304262 | A1 | 10/2014 | Makki |
| 2014/0351046 | A1 | 11/2014 | Carlyle |
| 2015/0145662 | A1* | 5/2015 | Barfield, Jr. ......... G08B 25/016 340/436 |
| 2015/0234570 | A1 | 8/2015 | Hampson |
| 2015/0331856 | A1* | 11/2015 | Choi ....................... G06Q 50/01 707/746 |
| 2015/0348591 | A1 | 12/2015 | Kaps |
| 2016/0210367 | A1 | 7/2016 | Yamada |
| 2017/0011053 | A1 | 1/2017 | Hubbard |
| 2017/0075749 | A1* | 3/2017 | Ambichl ............... G06F 11/079 |
| 2017/0075995 | A1 | 3/2017 | Fleischman |
| 2017/0076217 | A1 | 3/2017 | Krumm |
| 2017/0098181 | A1* | 4/2017 | Herman ........... G06Q 10/06311 |
| 2017/0142200 | A1 | 5/2017 | Kodner et al. |
| 2017/0262697 | A1 | 9/2017 | Kaps |
| 2017/0279957 | A1 | 9/2017 | Abramson et al. |
| 2017/0286621 | A1* | 10/2017 | Cox ....................... G16H 50/30 |
| 2018/0097762 | A1 | 4/2018 | Garcia |
| 2018/0146354 | A1* | 5/2018 | Patel ....................... H04W 4/90 |
| 2018/0151174 | A1 | 5/2018 | Lee |
| 2018/0157700 | A1 | 6/2018 | Roberts |
| 2018/0199179 | A1 | 7/2018 | Rauner |
| 2018/0225687 | A1 | 8/2018 | Ahmed |
| 2018/0287797 | A1 | 10/2018 | Banerjee |
| 2018/0342036 | A1 | 11/2018 | Zachary |
| 2019/0068784 | A1 | 2/2019 | Reddy |
| 2019/0082044 | A1 | 3/2019 | Melendez |

OTHER PUBLICATIONS

U.S. Appl. No. 16/396,454, Non Final Office Action dated Jun. 28, 2019, 14 pages.

U.S. Appl. No. 16/379,401, Non Final Office Action dated May 15, 2019, 22 pages.

U.S. Appl. No. 16/287,035, Non Final Office Action dated Apr. 15, 2019, 23 pages.

U.S. Appl. No. 16/374,939, Non Final Office Action dated Jun. 25, 2019, 9 pages.

U.S. Appl. No. 16/388,570, Non Final Office Action dated May 14, 2019, 11 pages.

* cited by examiner

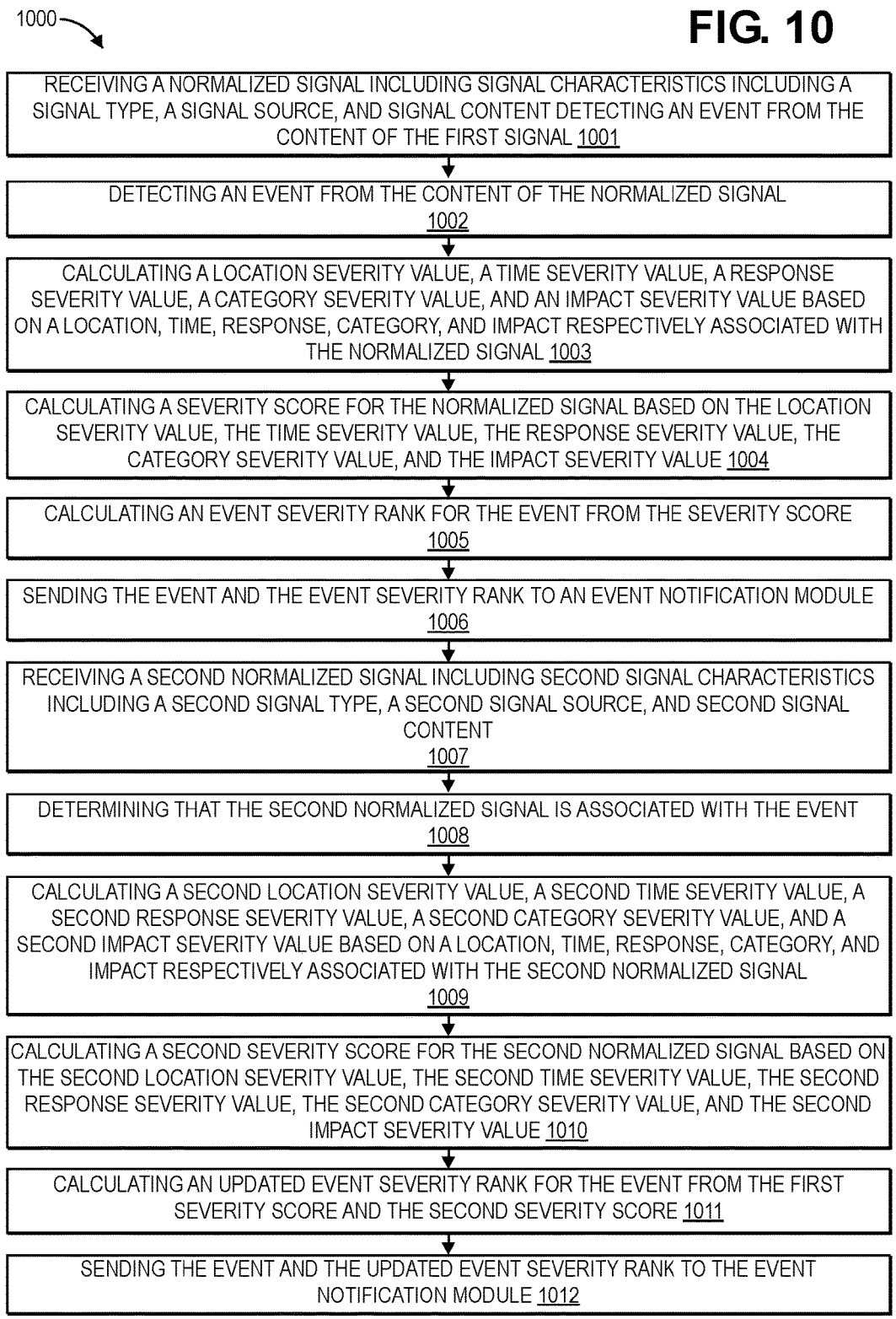

NOTIFYING ENTITIES OF RELEVANT EVENTS

CROSS-REFERENCE TO RELATED APPLICATIONS

This application claims the benefit of U.S. Provisional Patent Application Ser. No. 62/657,695, entitled "Event Identification And Notification Based On Entity Selected Event Notification Preferences", filed Apr. 13, 2018, which is incorporated herein in its entirety. This application claims the benefit of U.S. Provisional Patent Application Ser. No. 62/657,705, entitled "Pushing Event Notifications Based On Current or Predicted Entity Location", filed Apr. 13, 2018, which is incorporated herein in its entirety. This application claims the benefit of U.S. Provisional Patent Application Ser. No. 62/660,934, entitled "Event Identification And Notification Based On Entity Selected Event Notification Preferences", filed Apr. 20, 2018, which is incorporated herein in its entirety. This application claims the benefit of U.S. Provisional Patent Application Ser. No. 62/660,924, entitled "Pushing Event Notifications Based On Current or Predicted Entity Location", filed Apr. 20, 2018, which is incorporated herein in its entirety. This application claims the benefit of U.S. Provisional Patent Application Ser. No. 62/660,929, entitled "Determining Event Truthfulness From Multiple Input Signals", filed Apr. 20, 2018, which is incorporated herein in its entirety. This application claims the benefit of U.S. Provisional Patent Application Ser. No. 62/664,001, entitled "Normalizing Different Types Of Ingested Signals Into A Common Format", filed Apr. 27, 2018, which is incorporated herein in its entirety. This application claims the benefit of U.S. Provisional Patent Application Ser. No. 62/667,616, entitled "Normalizing Different Types Of Ingested Signals Into A Common Format", filed May 7, 2018, which is incorporated herein in its entirety. This application claims the benefit of U.S. Provisional Patent Application Ser. No. 62/669,540, entitled "Determining Event Severity From Multiple Input Signals", filed May 10, 2018, which is incorporated herein in its entirety. This application claims the benefit of U.S. Provisional Patent Application Ser. No. 62/686,791 entitled, "Normalizing Signals", filed Jun. 19, 2018, which is incorporated herein in its entirety.

BACKGROUND

1. Background and Relevant Art

Entities (e.g., parents, guardians, friends, relatives, teachers, social workers, first responders, hospitals, delivery services, media outlets, government entities, etc.) may desire to be made aware of relevant events (e.g., fires, accidents, police presence, shootings, etc.) as close as possible to the events' occurrence. However, entities typically are not made aware of an event until after a person observes the event (or the event aftermath) and calls authorities.

Some techniques to automate event detection have been attempted. However, in general, automated event detection techniques are unreliable. Some techniques attempt to mine social media data to detect events and forecast when events might occur. However, events can occur without prior planning and/or may not be detectable using social media data. Further, these techniques are not capable of meaningfully processing available data nor are these techniques capable of differentiating false data (e.g., hoax social media posts)

Further, data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

Extract, transform, and load (ETL) refers to a technique that extracts data from data sources, transforms the data to fit operational needs, and loads the data into an end target. ETL systems can be used to integrate data from multiple varied sources, such as, for example, from different vendors, hosted on different computer systems, etc.

ETL is essentially an extract and then store process. Prior to implementing an ETL solution, a user defines what (e.g., subset of) data is to be extracted from a data source and a schema of how the extracted data is to be stored. During the ETL process, the defined (e.g., subset of) data is extracted, transformed to the form of the schema (i.e., schema is used on write), and loaded into a data store. To access different data from the data source, the user has to redefine what data is to be extracted. To change how data is stored, the user has to define a new schema.

ETL is beneficial because it allows a user to access a desired portion of data in a desired format. However, ETL can be cumbersome as data needs evolve. Each change to the extracted data and/or the data storage results in the ETL process having to be restarted. As such, ETL is marginally practical, at best, for automated event detection. When using ETL, measures can be taken to reduce the possibility of introducing errors or inconsistencies into event detection and notification processes. However, inevitably errors and/or inconsistencies occur at least from time to time.

Unfortunately, many events are related to human suffering and possibly even human death, such as, for example, accidents, shootings, natural disasters, etc. Entities being notified of such events (e.g., drivers, first responders, disaster relief organizations, etc.) attempt to tailor their response based on circumstances of an event. Thus, entities can rely on event notification when allocating and expending resources. Errors or inconsistencies in event detection and notification may cause entities to respond inappropriately (insufficiently), waste resources, etc.

BRIEF SUMMARY

Examples extend to methods, systems, and computer program products for notifying entities of relevant events.

An event feed containing a plurality of events is received. Each event is detected from one or more normalized signals and includes an event location, an event category, an event truthfulness, an event severity, and an event time. Entity notification preferences defining events relevant to an entity are accessed. The entity notification preferences include category preferences, location preferences, distance preferences, truth preferences, severity preferences, and time preferences. The location preferences and distance preferences collectively define that the entity is interested in events within a specified distance of one or more locations. The time preferences define that the entity desires event notification at least within a specified time period of event detection.

For an event in the event feed, characteristics of the event are compared to the entity notification preferences. Comparison can include: comparing the event location to the location preferences in view of the distance preferences, comparing the event category to the category preferences, comparing the event truthfulness to the truth preferences, and comparing the event severity to the severity preferences. It is determined that the event satisfies the entity notification preferences based on the comparisons. The entity (or another entity) is notified of the event in compliance with the time preferences.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 10 illustrates a flow chart of an example method for determining event severity.

FIGS. 11A-1 and 11A-2 illustrate a computer architecture that facilitates identifying relevant events and notifying entities of relevant events.

DETAILED DESCRIPTION

Figure 1A:
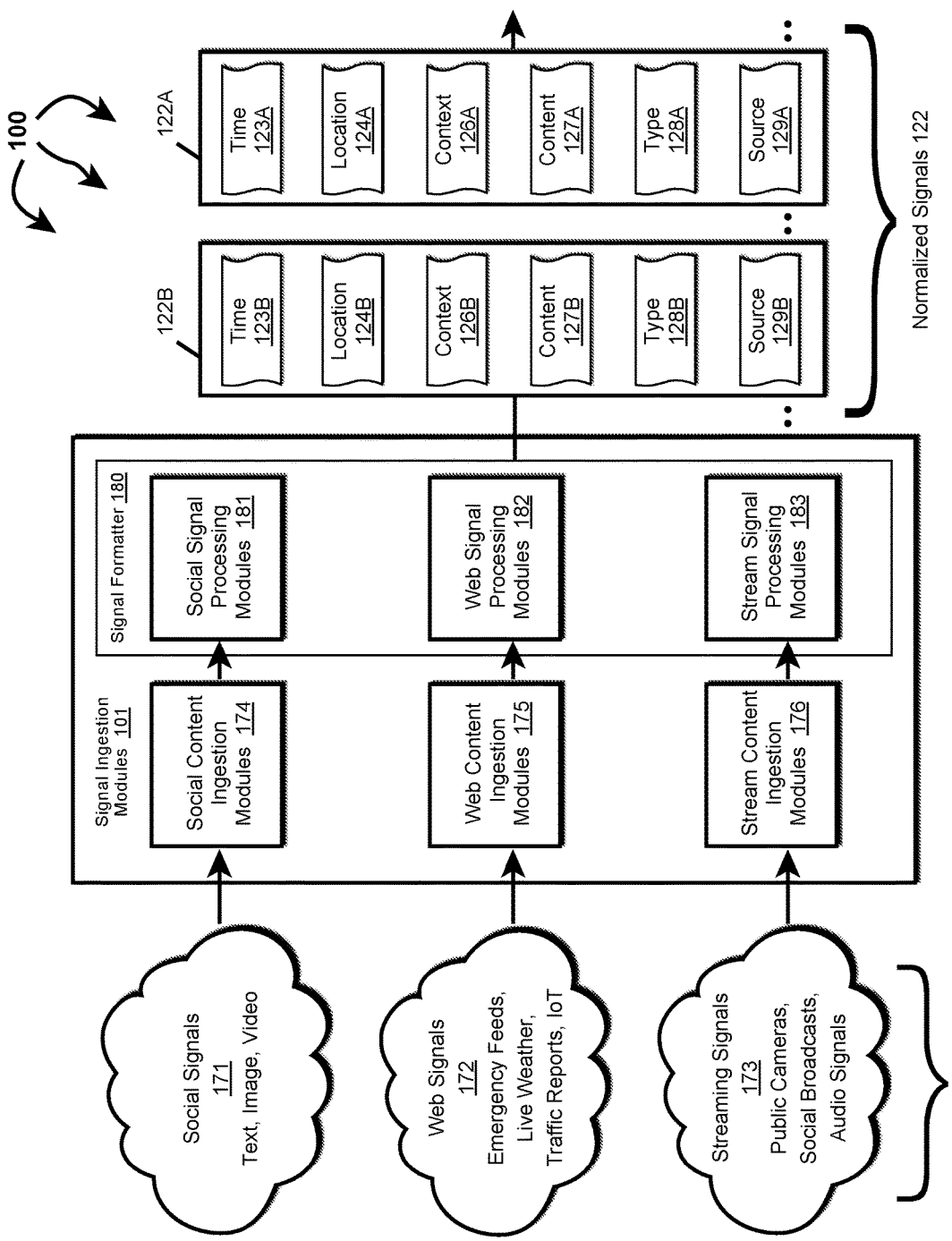
FIG. 1A illustrates an example computer architecture that facilitates normalizing ingesting signals.

Examples extend to methods, systems, and computer program products for notifying entities of relevant events.

Entities (e.g., parents, other family members, guardians, friends, teachers, social workers, first responders, hospitals, delivery services, media outlets, government entities, security personnel, etc.) may desire to be made aware of relevant events as close as possible to the events' occurrence (i.e., as close as possible to "moment zero"). Different types of ingested signals (e.g., social media signals, web signals, and streaming signals) can be used to detect events. Event relevancy can be determined from entity selectable notification preferences including but not limited to: event categories, event location, a computed event truth, a computed event severity, event impact, etc. Entities can also select notification preferences indicating a minimal notification delay. The minimal notification delay defines a minimum time after a relevant event is detected that an entity desires notification of the relevant event.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events. For example, the event detection infrastructure can determine that features of multiple different normalized signals collectively indicate an event. Alternately, the event detection infrastructure can determine that features of one or more normalized signals indicate a possible event. The event detection infrastructure then determines that features of one or more other normalized signals validate the possible event. Signal features can include: signal type, signal source, signal content, Time (T) dimension, Location (L) dimension, Context (C) dimension, other circumstances of signal creation, etc.

The event detection infrastructure can send detected events to an event relevancy module. The event relevancy module can compare event characteristics to entity selected notification preferences. Based on the comparisons, the event relevancy module can determine a detected event is relevant to one or more entities. Relevant events can be forwarded to an event notification module along with entity identifiers for the one or more entities. The event notification module can use the entity identifiers to notify the one or more entities of the relevant event.

In one aspect, an entity identifier includes information for communicating with an entity, such as, for example, an email address, mobile telephone number, social media name, etc. In another aspect, an entity identifier is specific to the event relevancy module. Upon receiving an entity identifier, the event notification module refers to a database, list, mapping table, etc. that matches entity identifiers to corresponding information for communicating with an entity.

The event notification module notifies the one or more entities that the relevant event occurred and/or is occurring in accordance with entity notification preferences. The event notification module can use one or more communication mechanisms, such as, for example, email, text, social media direct message, etc., to attempt to notify an entity of a relevant event. In one aspect, an entity is notified of a relevant event within a period of time less than a selected minimal notification delay.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, signal features, single source probabilities, times, time dimensions, locations, location dimensions, geo cells, geo cell entries, designated market areas (DMAs), contexts, location annotations, context annotations, classification tags, context dimensions, events, truth values, truth scores, truth factors, geo fences, time decay functions, severity values, severity scores, severity ranks, signal groups, signal bursts, entity input, event notification preferences, event notifications, entity location data, entity locations, predicted impacts, impact notifications, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, signal features, single source probabilities, times, time dimensions, locations, location dimensions, geo cells, geo cell entries, designated market areas (DMAs), contexts, location annotations, context annotations, classification tags, context dimensions, events, truth values, truth scores, truth factors, geo fences, time decay functions, severity values, severity scores, severity ranks, signal groups, signal bursts, entity input, event notification preferences, event notifications, entity location data, entity locations, predicted impacts, impact notifications, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| Geohash Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), subscription data services, etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features (dimensions) of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173, on an on going basis and in essentially real-time. Raw signals 121 can include social posts, traffic camera feeds, other camera feeds, listening device feeds, 911 calls, weather data, planned events, IoT device data, crowd sourced traffic and road information, satellite data, air quality sensor data, smart city sensor data, public radio communication, subscription data service data, etc. As such, potentially thousands, millions or even billions of unique raw signals, each with unique characteristics, are can be ingested and used determine event characteristics, such as, event truthfulness, event severity, event category or categories, etc.

Signal ingestion module(s) 101 include social content ingestion modules 174, web content ingestion modules 176, stream content ingestion modules 176, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 176 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features (dimensions) of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Figure 2:
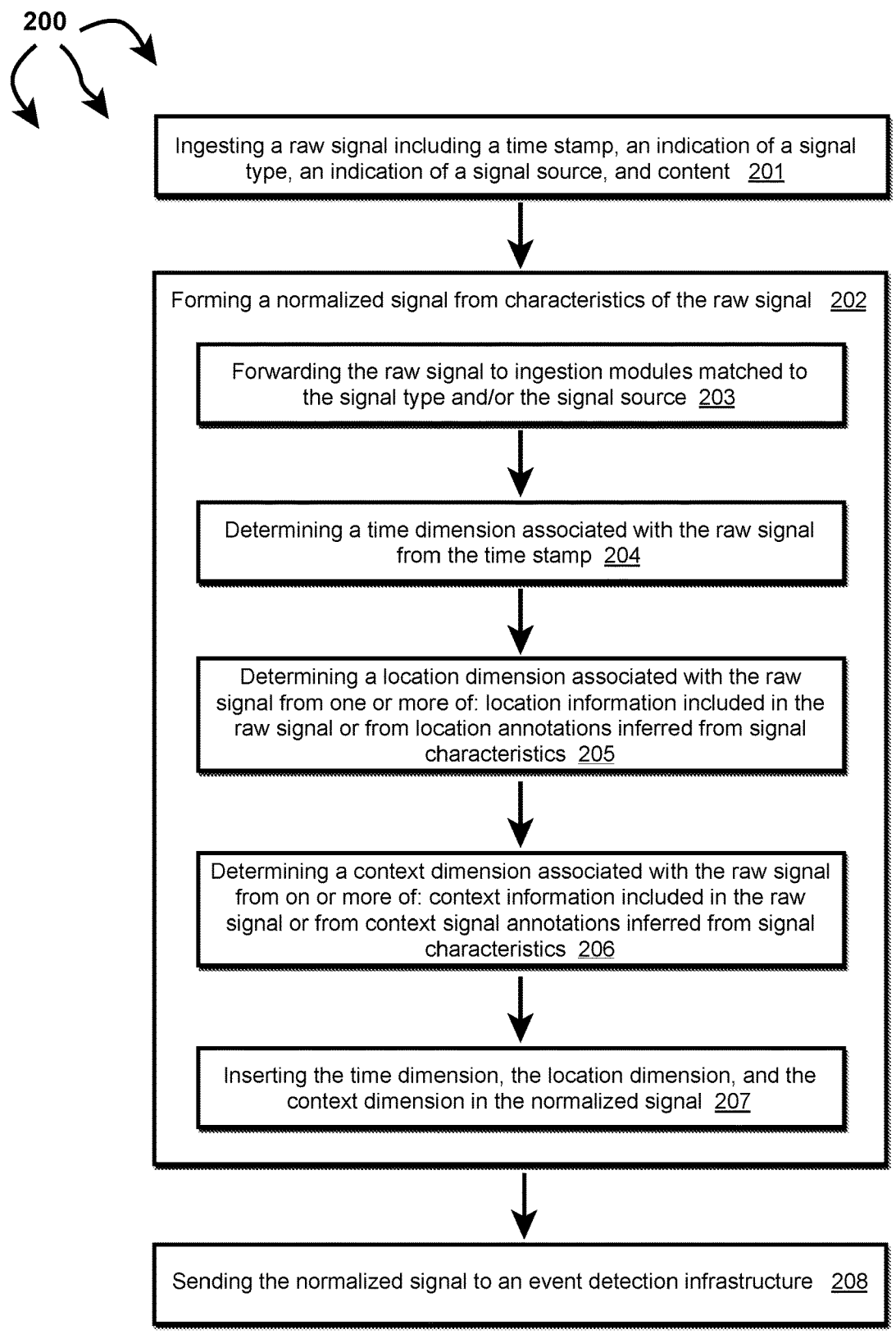
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Figure 3A:
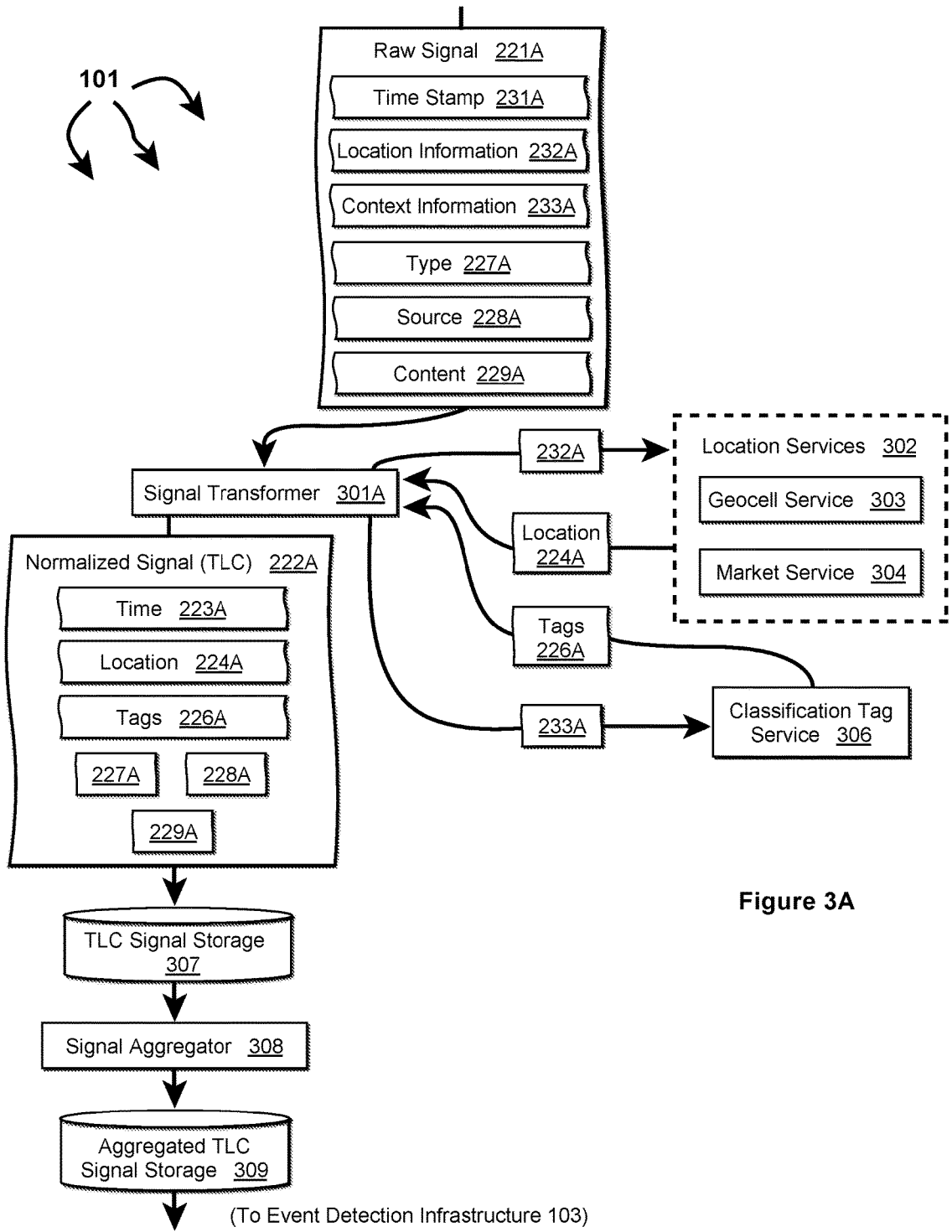
FIGS. 3A, 3B, and 3C illustrate other example components that can be included in signal ingestion modules.
Figure 3B:
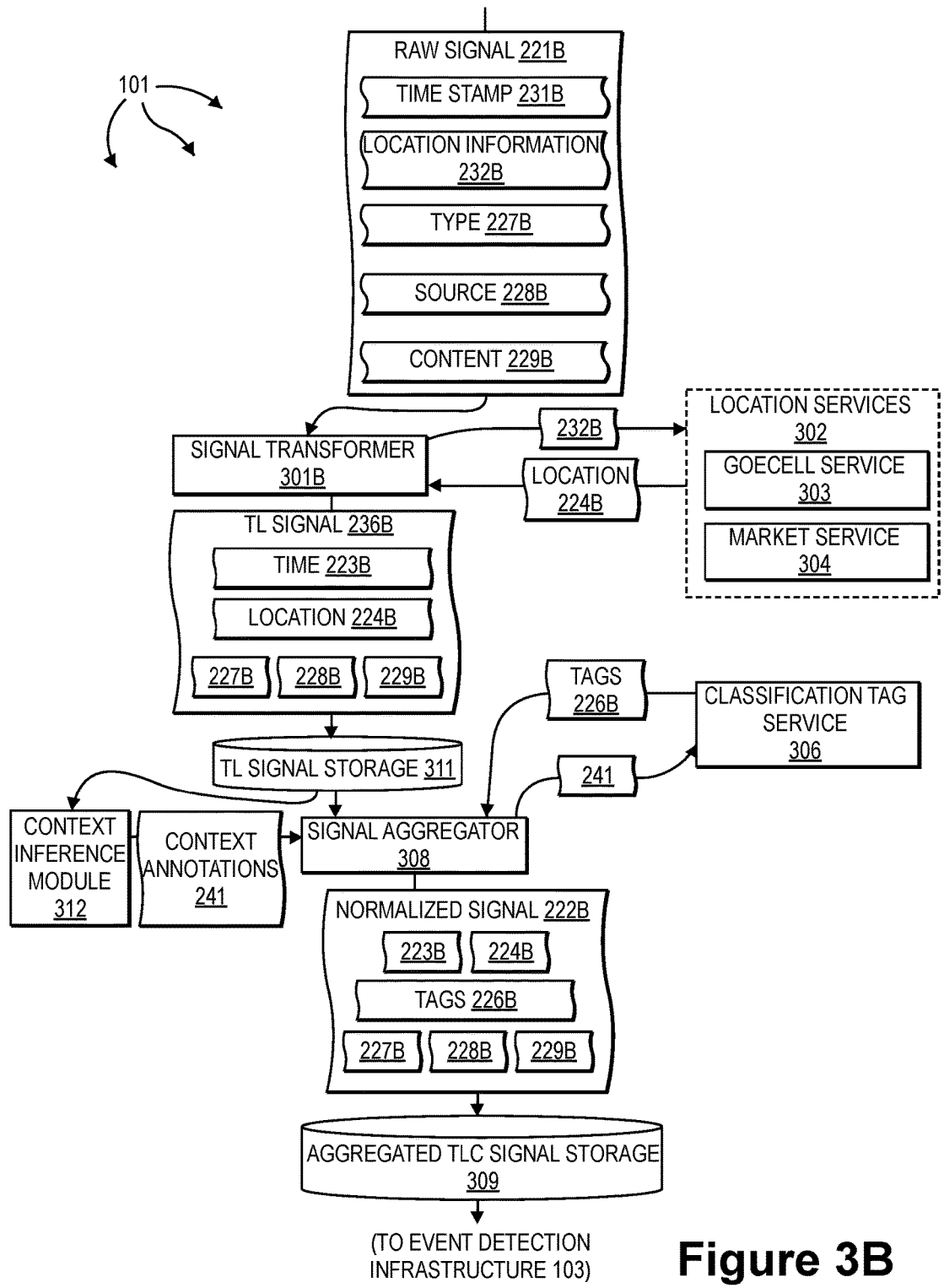
Figure 3C:
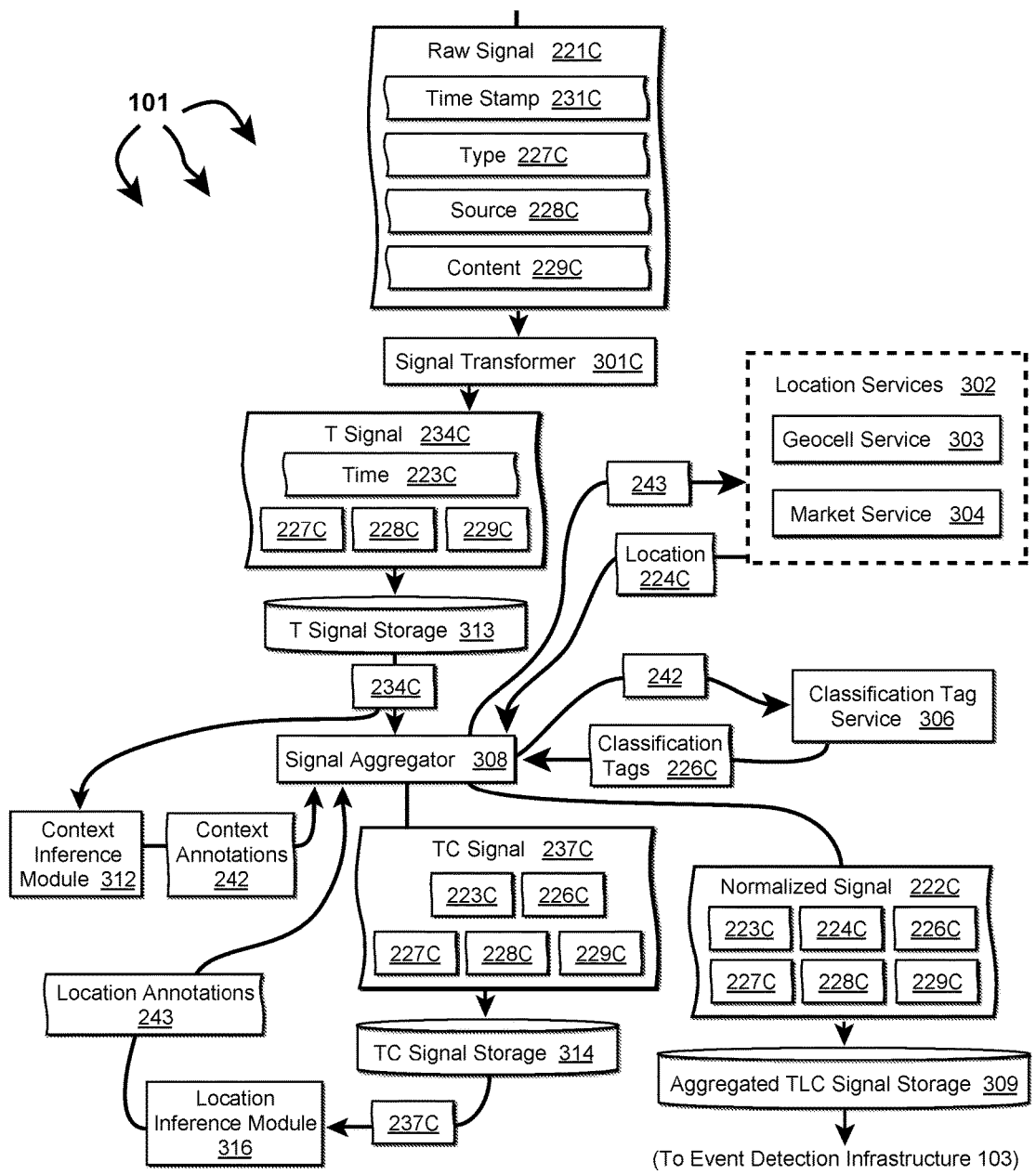

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 176, stream content ingestion modules 176, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality into normalized TLC signals.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

Figure 4:
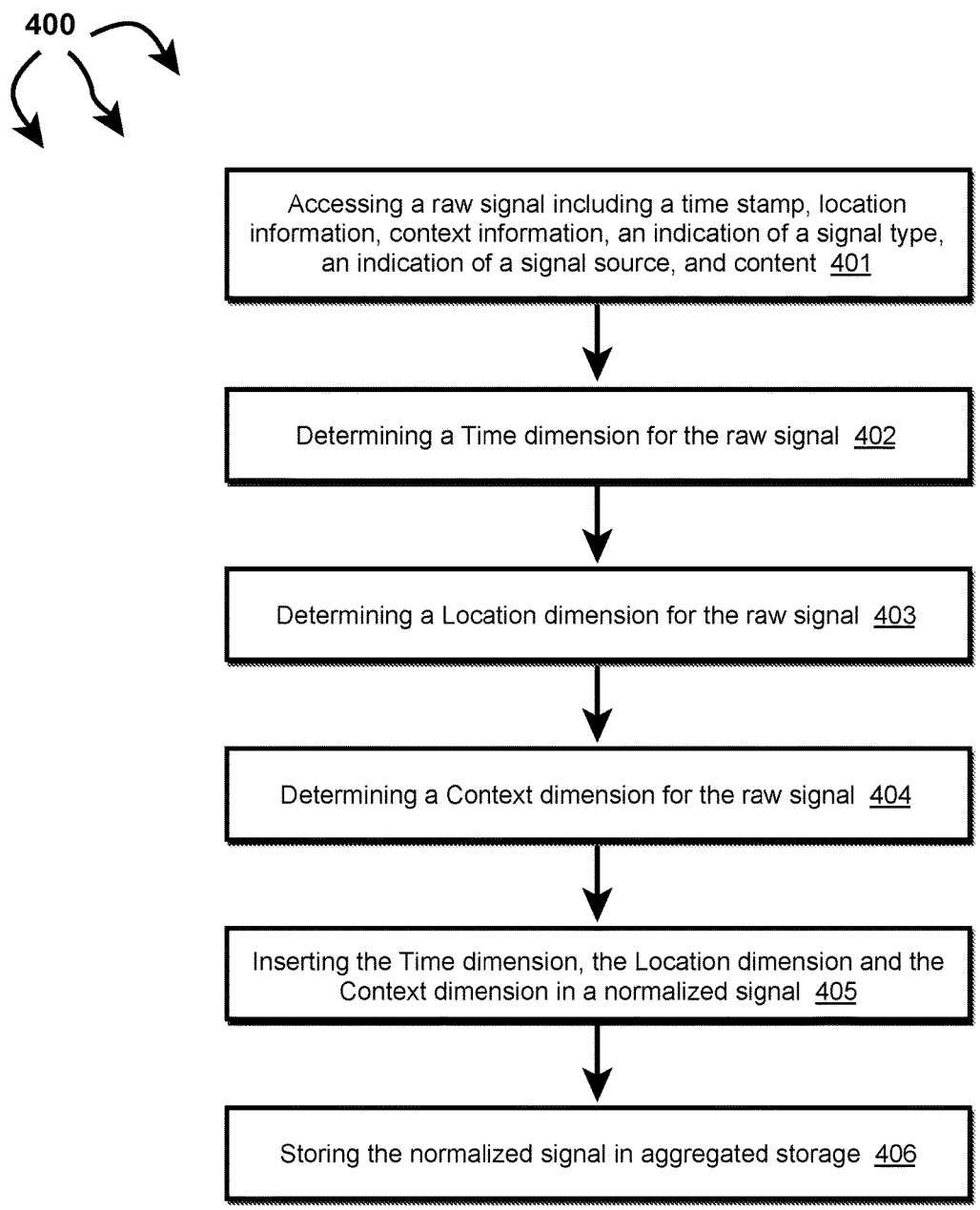
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., Facebook, twitter, Waze, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

Figure 5:
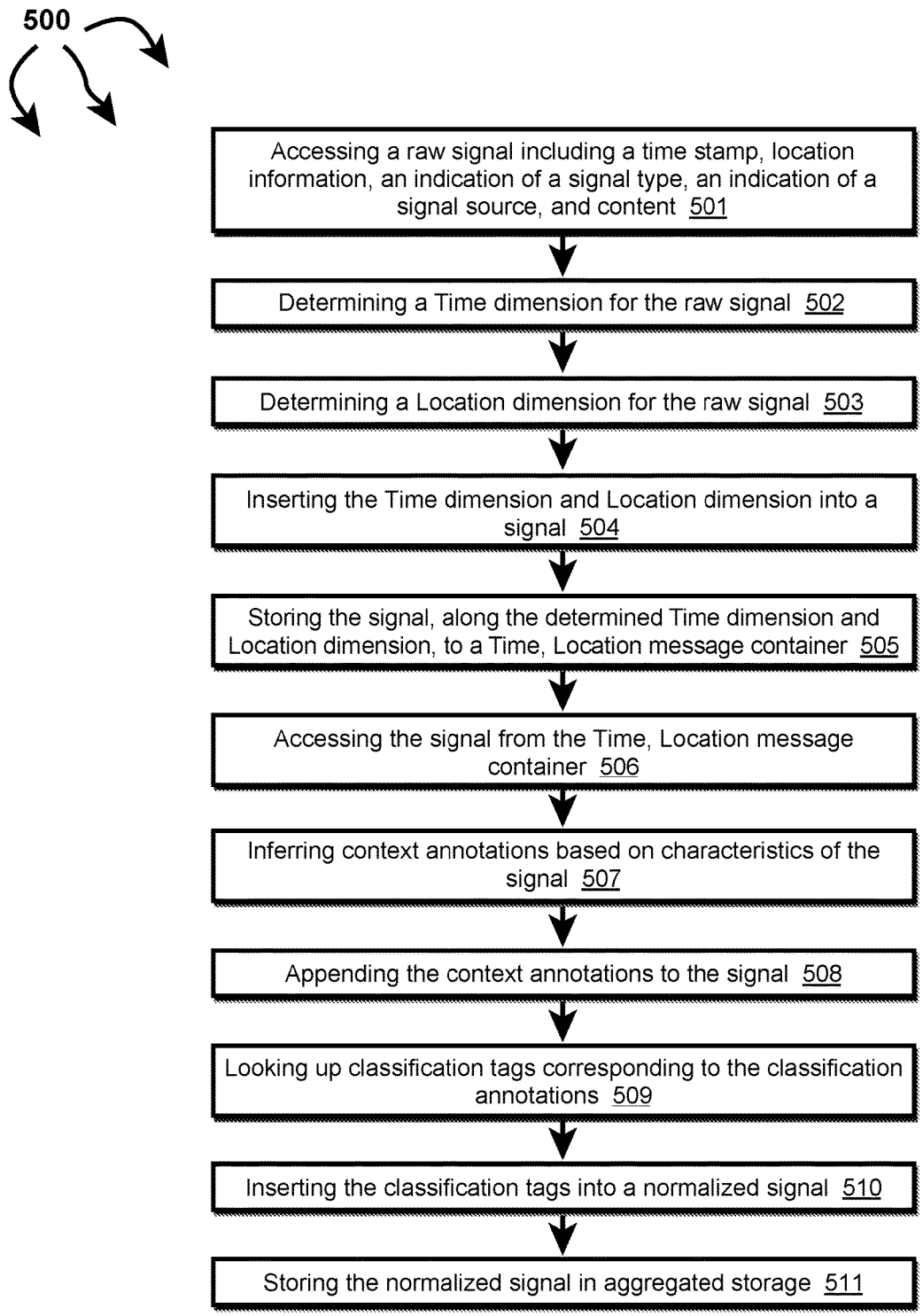
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., Facebook, twitter, Waze, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 312 includes one or more of: NLP modules, audio analysis modules, image analysis modules, video analysis modules, etc. Context inference module 312 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 312 can infer that content 229B is related to a fire. Context inference 312 module can return context annotations 241 to signal aggregator 308.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

Figure 6:
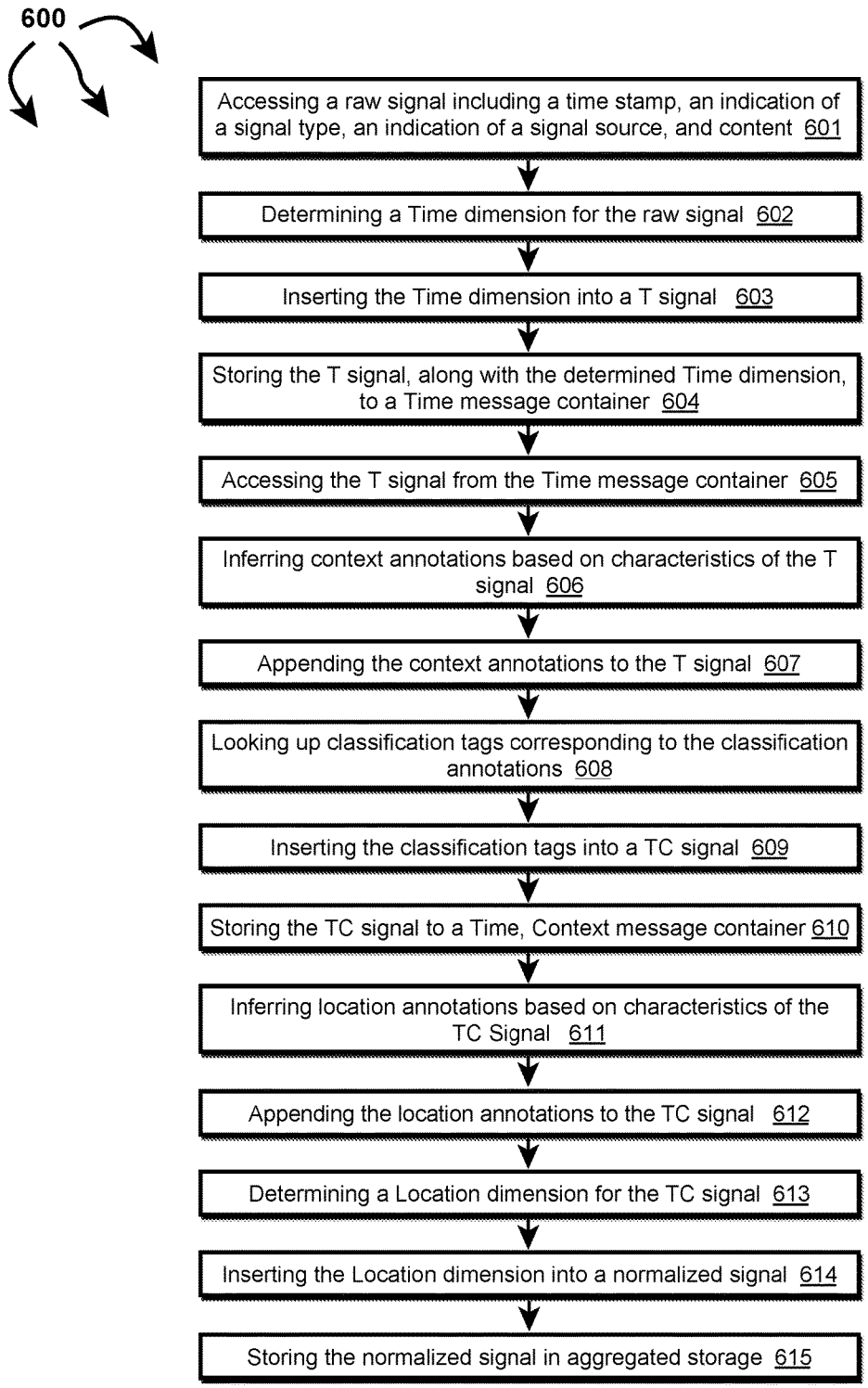
FIG. 6 illustrates a flow chart of an example method for normalizing an ingested signal including time information.

FIG. 6 illustrates a flow chart of an example method 600 for normalizing an ingested signal including time information and location information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., Facebook, twitter, Waze, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 312 can include one or more of: NLP modules, audio analysis modules, image analysis modules, video analysis modules, etc. Context inference module 312 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 312 can infer that content 229C is related to an accident. Context inference 312 module can return context annotations 242 to signal aggregator 308.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 308.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 241, and location annotations 24, can also be included (or remain) in normalized signal 222B).

In another aspect, a Location dimension is determined prior to a Context dimension when a T signal is accessed. A Location dimension (e.g., geo cell and/or DMA) and/or location annotations are used when inferring context annotations.

Accordingly, location services 302 can identify a geo cell and/or DMA for a signal from location information in the signal and/or from inferred location annotations. Similarly, classification tag service 306 can identify classification tags for a signal from context information in the signal and/or from inferred context annotations.

Signal aggregator 308 can concurrently handle a plurality of signals in a plurality of different stages of normalization. For example, signal aggregator 308 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 308 acting as an "air traffic controller" of live data. Signals from multiple sources of data can be aggregated and normalized for a common purpose (e.g., of event detection). Data ingestion, event detection, and event notification can process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

Event Detection

Figure 1B:
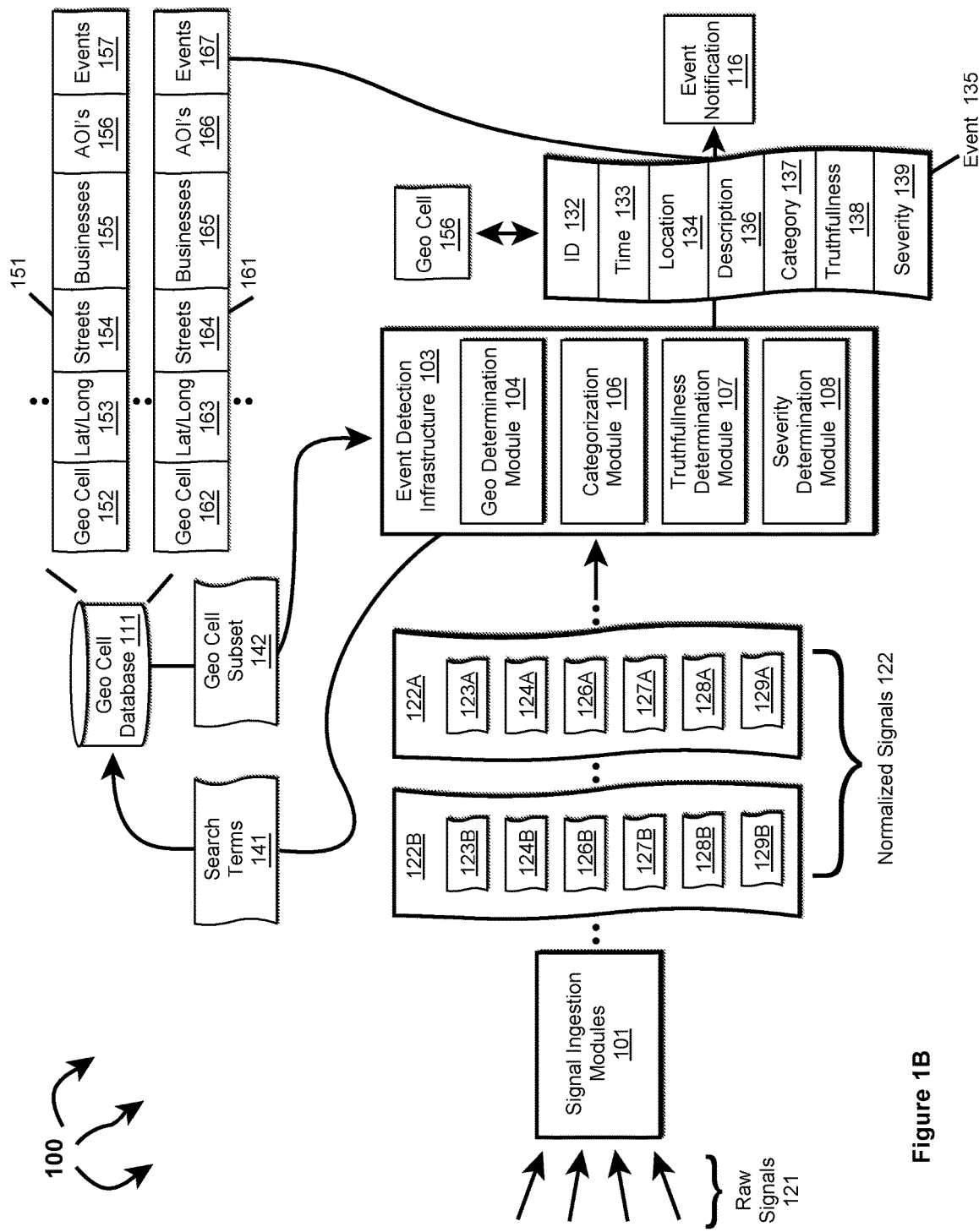
FIG. 1B illustrates an example computer architecture that facilitates detecting events from normalized signals.

Turning back to FIG. 1B, computer architecture 100 also includes components that facilitate detecting events. As depicted, computer architecture 100 includes geo cell database 111 and event notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, a Context dimension in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Generally, geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Generally, categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Generally, truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Generally, severity determination module 108 can determine the severity of a detected event based on or more of:

location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Determining Event Truthfulness

When determining how (or if) to respond to notification of an event, an entity may consider the truthfulness of the detected event. The entity may desire some level of confidence in the veracity of a detected event before taking an action. For example, the entity may want assurances that a detected event isn't a hoax, fake, misinterpreted, etc. Accordingly, aspects of the invention include mechanisms for determining truthfulness of an event from multiple input signals used to detect the event.

Thus, as generally described, truthfulness determination module 107 can determine an event truthfulness. In one aspect, truth scores are calculated for received signals as the signals are received. Truthfulness determination module 107 calculates and recalculates an evolving truth factor (truthfulness) for an event from the truth scores. In one aspect, the truth factor (truthfulness) is sent along with a detected event to event notification 116. Event notification 116 can also send the truth factor (truthfulness) to an entity that is notified of the detected event. In one aspect, an entity registers to receive events at or above a specified truthfulness. The entity can then be notified of events having a truth factor at or above the specified truthfulness. On the other hand, events having a truth factor below the specified truthfulness can be filtered out and not sent to the entity.

Truth factor (truthfulness) can be represented as a score, a numeric value, a percentage, etc. In one aspect, truth factor (truthfulness) is represented by a percentage between 0%-100% indicating a probability that an associated event is actually occurring (or is actually true). Percentages closer to 100% can indicate an increased probability that an associated event is actually occurring. On the other hand, percentages closer to 0% can indicate a decreased probability that an associated event is actually occurring.

Similar indications can be associated with scores and numeric values. Higher scores or numeric values can indicate an increased likelihood that an associated event is actually occurring. Lower scores or numeric values can indicate a decreased likelihood that an associated event is actually occurring. However, in other aspects, lower scores or numeric values indicate increased likelihoods that an associated event is actually occurring and higher scores or numeric values indicate decreased likelihoods that an associated event is actually occurring. Scores and numeric values can be in a range, such as, for example, 1-5, etc.

When the score, numeric value, percentage, etc. representing truth factor (truthfulness) and associated with an event exceeds (or alternately is below) the specified threshold registered by an entity, the entity can be notified of the event, In this description and the following claims, the term "confidence level" is synonymous with "truth factor" and/or "truthfulness". Thus, confidence level is also applicable in implementations described as using "truth factor" and/or "truthfulness".

Thus, when an entity is notified of an event, the entity is also provided an indication of the event's truthfulness. As such, the entity can consider the event's truthfulness when determining how (if at all) to respond to the event.

For each normalized signal, truthfulness determination module 107 can determine various truth related values based on characteristics of the normalized signal. For example, truthfulness determination module 107 can determine one or more of: a signal type truth value based on signal type, a signal source truth value based on the signal source, and a signal content truth value based on content type(s) contained in the normalized signal. Truthfulness determination module 107 can compute a truth score for a normalized signal by combining the signal type truth value, the signal source truth value, and the signal content truth value determined for the signal. Truthfulness determination module 107 can assign the truth score to the normalized signal.

In one aspect, event detection infrastructure 103 detects an event at least in part on truth characteristics of a signal. For example, truthfulness determination module 107 determines one or more of: a signal type truth value based on signal type of the first signal, a signal source truth value based on the signal source of the first signal, and a signal content truth value based on content type(s) contained in the first signal. Truthfulness determination module 107 computes a first truth score for the first signal by combining: the signal type truth value, the signal source truth value, and the signal content truth value determined for the first signal. Truthfulness determination module 107 assigns the first truth score to the first signal. Based on the first truth score (e.g., exceeding a threshold), event detection infrastructure 103 can trigger an event detection for the event. Truthfulness determination module 107 can also compute a truth factor for the detected event based on the first truth score.

Per normalized signal, event detection infrastructure 103 and/or truthfulness determination module 107 can also determine/maintain a signal origination time, a signal reception time, and a signal location. Event detection infrastructure 103 and/or truthfulness determination module 107 can track signal origination time, signal reception time, and signal location per normalized signal. Thus, when a first normalized signal triggers an event detection, event detection infrastructure 103 and/or truthfulness determination module 107 can determine and record a signal origination time, a signal reception time, and a signal location associated with the first normalized signal.

Subsequent to triggering initial event detection, event detection infrastructure 103 can determine that a second normalized signal is related to the initial event detection based on characteristics of the second normalized signal. Truthfulness module 107 computes one or more of: a signal type truth value based on signal type of the second signal, a signal source truth value based on the signal source of the second signal, and a signal content truth value based on content type(s) contained in the second signal.

In addition, event detection infrastructure 103 and/or truthfulness module 107 determines and records a signal origination time, a signal reception time, and a signal location associated with the second normalized signal. Event detection infrastructure 103 and/or truthfulness determination module 107 determines a distance measure between the signal location of the first normalized signal and the signal location of the second normalized signal. Event detection infrastructure 103 and/or truthfulness determination module 107 computes a time measure between the signal origination time of the first normalized signal and the signal origination time of the second normalized signal.

Truthfulness determination module 107 computes a second truth score for the second normalized signal by combining: the signal type truth value determined for the second normalized signal, the signal source truth value determined for the second normalized signal, the signal content truth value determined for the second normalized signal, the distance measure, and the time measure. Truthfulness determination module 107 assigns the second truth score to the second signal. Truthfulness determination module 107 can also recompute a truth factor for the detected event based on the first truth score and the second truth score.

If/when the event detection infrastructure determines that additional signals are related to the detected event, similar actions can be implemented on a per normalized signal basis to compute a signal truth score for the normalized signal and recompute an evolving truth factor for the detected event from aggregated truth scores.

The truth factor for a detected event can decay over time. Time decay can be configured per event category based on historical analysis of signal data. A decay function/curve can be maintained per event category. A time decay function/curve can be applied to a truth factor to indicate a reduction in truthfulness as time passes from initial event detection.

Figure 7:
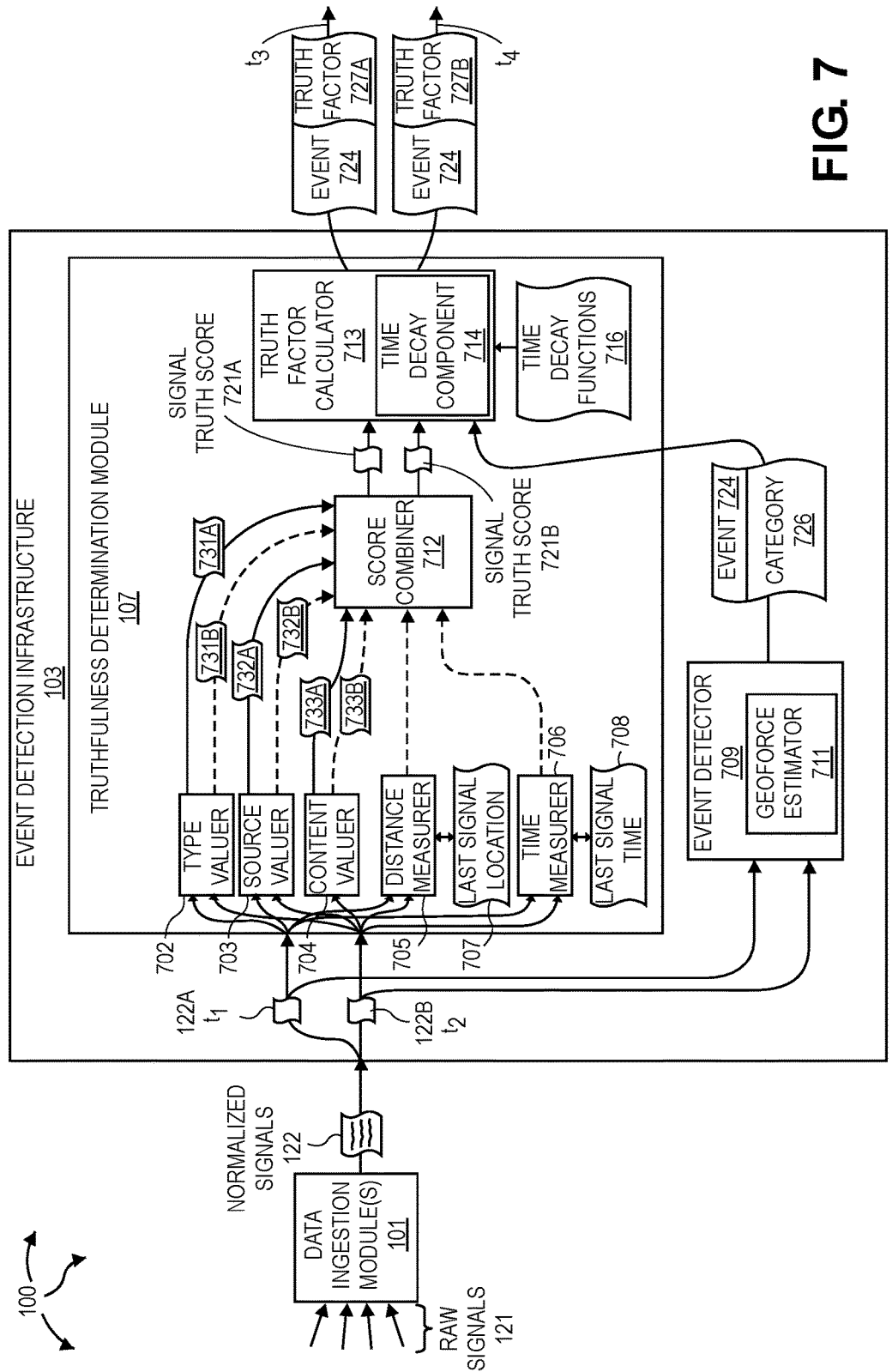
FIG. 7 illustrates a more detailed view of truthfulness determination module.

FIG. 7 illustrates a more detailed view of truthfulness determination module 107. Normalized signals received at event detection infrastructure 103 can be sent to truthfulness determination module 107 and event detector 709. From one or more normalized signals 122, event detector 709 can detect an event. In one aspect, geofence estimator 711 estimates a distance between signals and event detector 709 considers signals that are within a specified distance of each other (or contained in the same geofence). For example, geofence estimator 711 can estimate if signals are within the same geofence.

As depicted, truthfulness module 107 includes type valuer 702, source valuer 703, content valuer 704, distance measurer 705, and time measurer 706. Type valuer 702 can determine a type value for a signal based on signal type. Source valuer 703 can determine a source value for a normalized signal based on signal source. Content valuer 704 can determine a content value for a normalized signal based on content types contained in the signal. Distance measurer 705 can determine a signal location of a normalized signal and measure a distance between the signal location of the normalized signal and the signal location of a previously received normalized signal (when a location of a previously received normalized signal is available). Time measurer 706 can determine a signal origination time for a normalized signal and measure a time between the signal origination time of normalized signal and the signal origination time of a previously received normalized signal (when a origination time of a previously received normalized signal is available).

A type value, a source value, and a content value and, when appropriate, a distance measure and a time measure for a normalized signal can be sent to score combiner 712. Score combiner 712 can combine received values and measures into a signal truthfulness score. Score combiner 712 can send the signal truthfulness score to truth factor calculator 713. Truth factor calculator 713 can calculate a truth factor for an event from one or more signal truth scores. Time decay component 214 can discount a truth factor for an event over time based on a time decay function corresponding to a category of the event.

Thus, a truth factor for an event can evolve over time and as additional normalized signals are received.

Figure 8:
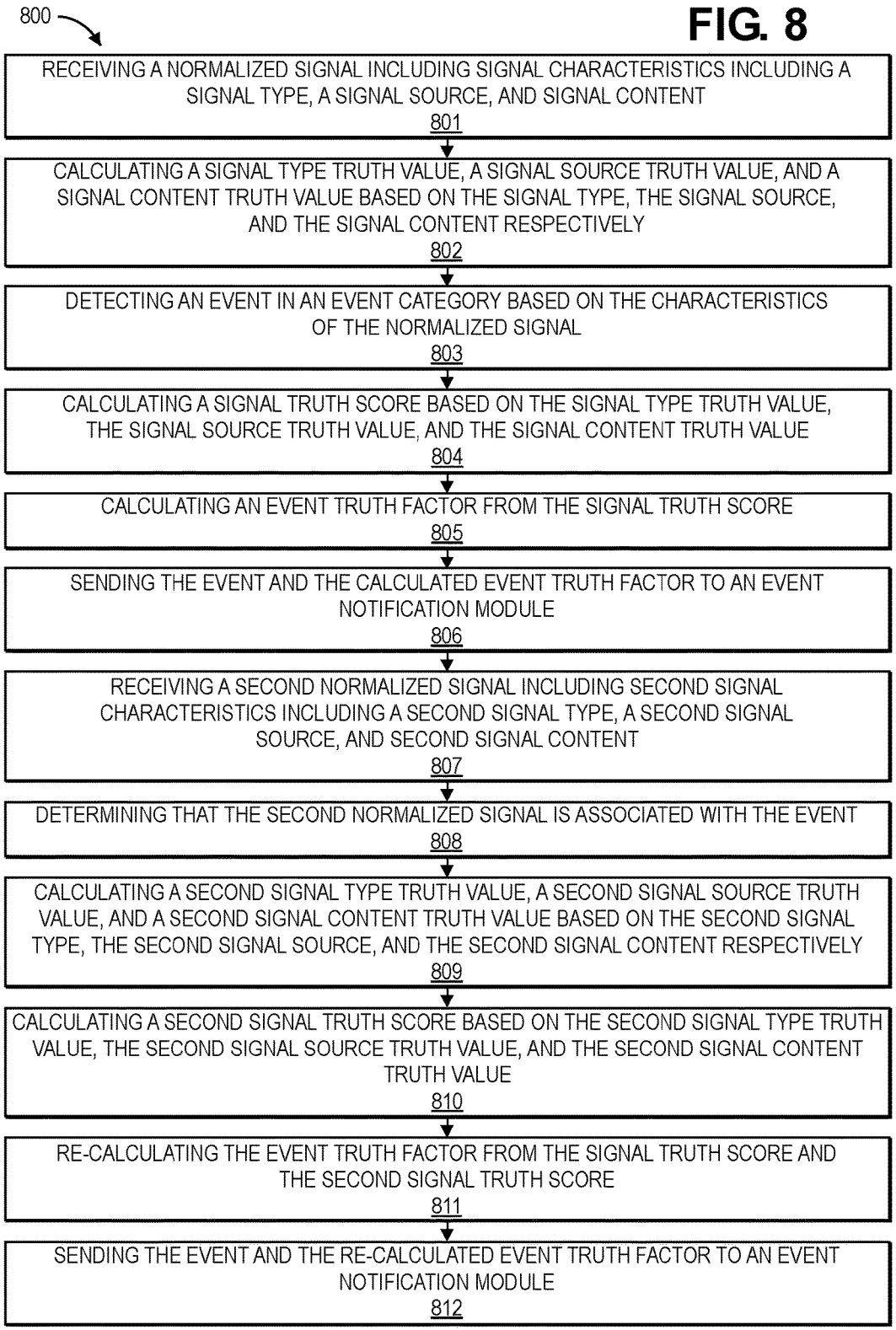
FIG. 8 illustrates a flow chart of an example method for determining event truthfulness.

FIG. 8 illustrates a flow chart of an example method 800 for determining event truthfulness. Method 800 will be described with respect to the components and data depicted in FIG. 7.

Method 800 includes receiving a normalized signal including signal characteristics including a signal type, a signal source, and signal content (801). For example, event detection infrastructure 103 can receive normalized signal 122A at time $t_1$. Normalized signal 122A includes type 128A, source 129A, and content 127A. Normalized signal 122A can be forwarded to truthfulness determination module 107 and event detector 709.

Method 800 includes calculating a signal type truth value, a signal source truth value, and a signal content truth value based on the signal type, the signal source, and the signal content respectively (802). For example, type valuer 702 can calculate signal type truth value 731A from type 128A, source valuer 703 can calculate signal source truth value 732A from source 129A, and content valuer 704 can calculate signal content truth value 733A from content 127A. Type valuer 702 can send signal type truth value 731A to score combiner 712. Source valuer 703 can send signal source truth value 732A to score combiner 712. Content valuer 704 can send signal content truth value 733A to score combiner 712.

Method 800 includes detecting an event in an event category based on the characteristics of the normalized signal (803). For example, event detector 709 can detect event 724 in category 726 based on the characteristics of normalized signal 122A (a trigger signal) (including any of time 123A, location 124A, context 126A, content 127A, type 128A, sources 129A, etc.) Event detector 709 can send event 724 and category 726 to truth factor calculator 713.

Distance measurer 705 can store location 124A as last signal location 707. Time measurer 706 can store time 123A as last signal time 708.

Method 800 includes calculating a signal truth score based on the signal type truth value, the signal source truth value, and the signal content truth value (804). For example, score combiner 712 can calculate signal truth score 721A based on signal type truth value 731A, source truth value 732A, and signal content truth value 733A. Score combiner 712 can send signal truth score 721A to truth factor calculator 713.

Method 800 includes calculating an event truth factor from the signal truth score (805). For example, truth factor calculator 713 can calculate event truth factor 727A for event 724 from signal truth score 721A. Method 800 includes sending the event and the calculated event truth factor to an event notification module (806). For example, event detection infrastructure 103 can send event 724 and truth factor 727A to event notification 116 at time $t_3$. Time $t_3$ can be after time $t_1$. Truth factor 727A can indicate a truthfulness of event 724.

Method 800 includes receiving a second normalized signal including second signal characteristics including a second signal type, a second signal source, and second signal content (807). For example, event detection infrastructure 103 can receive normalized signal 122B at time $t_2$. Normalized signal 122B includes type 128B, source 129B, and content 127B. Normalized signal 122B can be forwarded to truthfulness determination module 107 and event detector 709.

Method 800 includes determining that the second normalized signal is associated with the event (808). For example, geofence estimator 711 can estimate that location 124B is within a threshold distance of location 124A. Based on location 124B being estimated to be within a threshold distance of location 124A, event detector 209 can detect signal 122B as confirming/validating, etc. event 224.

Method 800 includes calculating a second signal type truth value, a second signal source truth value, and a second signal content truth value based on the second signal type, the second signal source, and the second signal content respectively (809). For example, type valuer 702 can calculate signal type truth value 731B from type 128B, source valuer 703 can calculate signal source truth value 732B from source 129B, and content valuer 704 can calculate signal content truth value 733B from content 127B. Type valuer 702 can send signal type truth value 731B to score combiner 712. Source valuer 703 can send signal source truth value 732B to score combiner 712. Content valuer 704 can send signal content truth value 733B to score combiner 712.

Method 800 includes calculating a second signal truth score based on the second signal type truth value, the second signal source truth value, and the second signal content truth value (810). For example, score combiner 712 can calculate signal truth score 721B based on signal type truth value 731B, source truth value 732B, and signal content truth value 733B. Score combiner 712 can send signal truth score 721B to truth factor calculator 713.

Method 800 includes re-calculating the event truth factor from the signal truth score and the second signal truth score (811). For example, truth factor calculator 713 can re-calculate truth factor 727A as truth factor 727B from signal truth score 721A and signal truth score 721B. In one aspect, truth factor calculator 713 calculates truth factor 227B for event 224 from a combination of truth score 721A, truth score 721B, and a time decay discount value. The time decay discount value can be calculated in accordance with a time decay function 216 corresponding to category 726.

Method 800 includes sending the event and the re-calculated (updated) event truth factor to an event notification module (812). For example, event detection infrastructure 103 can send event 724 and truth factor 727B to event notification 116 at time $t_4$. Time $t_4$ can be after time $t_2$. Truth factor 727B can indicate a truthfulness of event 724. Truth factor 721B can indicate increased or decreased truthfulness of event 724 relative to truth factor 721A.

It may also be that distance measurer 205 measures a distance between location 124A and 124B and sends the distance measure to score combiner 712. Distance measurer 705 can also store the location of signal 122B as last signal location 207. Time measurer 706 can also measure a time difference between time 123A and 123B and sends the measured time difference to score combiner 712. Score combiner 712 can combine type value 732A, source value 732B, content value 733B, the measure distance, and the measured time difference into truth score 721B.

In some aspects, signals are grouped into social (Facebook, Instagram, Twitter, etc.) and non-social (EMS radio communication, CAD, Traffic Cameras, etc.). Individual signals can be valued based on truth factor evaluation (e.g., Computer Aided Dispatch (CAD)) and Emergency Management System (EMS) radio communication signals rank higher than Twitter/FB source signals). Geofences can be generated based on available signals. The geofences can then be used to monitor correlating signals and thus can be used to adjust (improve) truth factor on a continuous basis. Time decay curves can be incorporated to generate value scores for each correlating new signal.

In one aspect, a signal truth score is computed from the equation:

Signal Truth Score=(Sig. Source Value*Sig. Type Value*Sig. Content Value*Distance Measure*Time Measure)

An event truth factor for an event can calculated from the equation:

Truth Factor=((Signal 1 Score+Signal 2 Score+ . . . +Signal $N$ Score)/$N$)*Time Decay For each category of events, a time decay function can be used to decay a truth factor over time.

Some examples of signal Type and/or Source Rank (value) include:

TABLE 2

Signal Type and/or Source Rank

| Signal Source | Signal Source Rank |
|---|---|
| Traffic Cameras | 10 |
| CAD | 9 |
| Twitter - State/Federal Agency Owned Accounts | 8 |
| Facebook - State/Federal Agency Owned Accounts | 7 |
| Twitter - Individual Owned Accounts | 6 |
| Facebook - Individual Owned Accounts | 5 |
| Instagram | 4 |
| Other | 3 |

Some examples of Signal Distance Rank (value) include:

TABLE 3

Signal Distance Rank

| Distance measure between the previous signal and the next new signal (in meters) | Signal Distance Rank |
|---|---|
| 50 | 10 |
| 100 | 9 |
| 200 | 8 |
| 500 | 7 |
| 800 | 6 |
| 1000+ | 5 |

Some example Signal Time Rank (value) include:

TABLE 4

Signal Time Rank

| Time measure between the previous signal and the next new signal (in seconds) | Signal Time Rank |
|---|---|
| 30 | 10 |
| 60 | 9 |
| 180 | 8 |
| 300 | 7 |
| 600 | 6 |
| 900+ | 5 |

Truthfulness determination module 107 can operate concurrently with other modules included in event detection infrastructure 103.

Determining Event Severity

Severity scores of individual normalized signals can be considered during event detection. In one aspect, the severity of an event is determined from characteristics of multiple normalized signals. Event severity can be determined concurrently with event detection and determination of other signal/event characteristics, including event truthfulness.

An event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations, such as, for example, "low", "medium", and "high", are also possible. Additional severity representations include percentages are also possible.

Signal volume (e.g., signal bursts) can be considered when deriving severity for an event. Signal groupings can also be considered from deriving severity for an event. Severity of historical events and corresponding combinations of normalized signals used to detect the historical events can be considered when deriving severity for a new event.

In one aspect, event detection infrastructure 103 determines that characteristics of a first normalized signal provide a basis for detection of an event. For the first normalized signal, severity determination module 108 determines one or more of: a signal location severity value based on signal location of the first normalized signal, a signal time severity value based on a signal time of the first normalized signal, a signal response severity value based on a dispatch codes in the first normalized signal, a signal category severity value based on a signal category of the first normalized signal, and a signal impact severity value based on a signal impact (e.g., on people/property) of the first normalized signal. Severity determination module 108 can compute a first signal severity score for the first normalized signal by combining: the signal location severity value, the signal time severity value, the signal response severity value, the signal category severity value, and the signal impact severity value.

Severity determination module 108 can also calculate an event severity rank from the first signal severity score.

Per normalized signal, event detection infrastructure 103 can also determine/maintain a signal origination time, a signal reception time, and a signal location. Event detection infrastructure 103 can track signal origination time, signal reception time, and signal location per normalized signal. Thus, when a first normalized signal triggers an event detection, event detection infrastructure 103 can determine and record a signal origination time, a signal reception time, and a signal location associated with the first normalized signal.

Subsequent to triggering event detection, event detection infrastructure 103 can determine that a second normalized signal is related to the initial event detection based on characteristics of the second normalized signal. For the second normalized signal, severity determination module 108 determines one or more of: a second signal location severity value based on signal location of the second normalized signal, a second signal time severity value based on a signal time of the second normalized signal, a second signal response severity value based on a dispatch codes in the second normalized signal, a signal category severity value based on a signal category of the second normalized signal, and a signal impact severity value based on a signal impact (e.g., on people/property) of the second normalized signal.

In addition, event detection infrastructure 103 determines and records a signal origination time, a signal reception time, and a signal location associated with the second normalized signal. Event detection infrastructure 103 determines a distance measure between the signal location of the first normalized signal and the signal location of the second normalized signal. Event detection infrastructure 103 also determines a time measure between the signal origination time of the first normalized signal and the signal origination time of the second normalized signal. The distance measure and time measure can be used to group normalized signals within a specified distance or time of one another.

Severity determination module 108 can compute a second signal severity score for the second normalized signal by combining: the second signal location severity value, the second signal time severity value, the second signal response severity value, the second signal category severity value, and the second signal impact severity value.

Severity determination module 108 recalculates the event severity rank for the event from the first signal severity score and the second signal severity score.

If/when event detection infrastructure 103 determines that additional normalized signals are related to the event, similar actions can be implemented on a per normalized signal basis to calculate a signal severity score for the normalized signal and recalculate an evolving event severity rank for the event from aggregated signal severity scores.

Severity determination module 108 can also consider event related signal volume, for example, a count of available CAD signals, burst detection of social signals, etc., when calculating an event severity rank for an event. For example, a burst of normalized signals related to an event may indicate a more severe event. Severity determination module 108 can also consider signal groupings when calculating an event severity rank for an event. A tighter grouping of normalized signals may indicate a more localized and thus less severe event. On the other hand, a wider grouping of normalized signals may indicate a less localized and thus more severe event.

Severity determination module 108 can also consider historical events and corresponding combinations of normalized signals used to detect the historical events when calculating a severity rank for a new event. For example, if a similar event was received in the past and assigned a particular severity rank, it may be appropriate to assign a similar severity rank to a new event.

Figure 9:
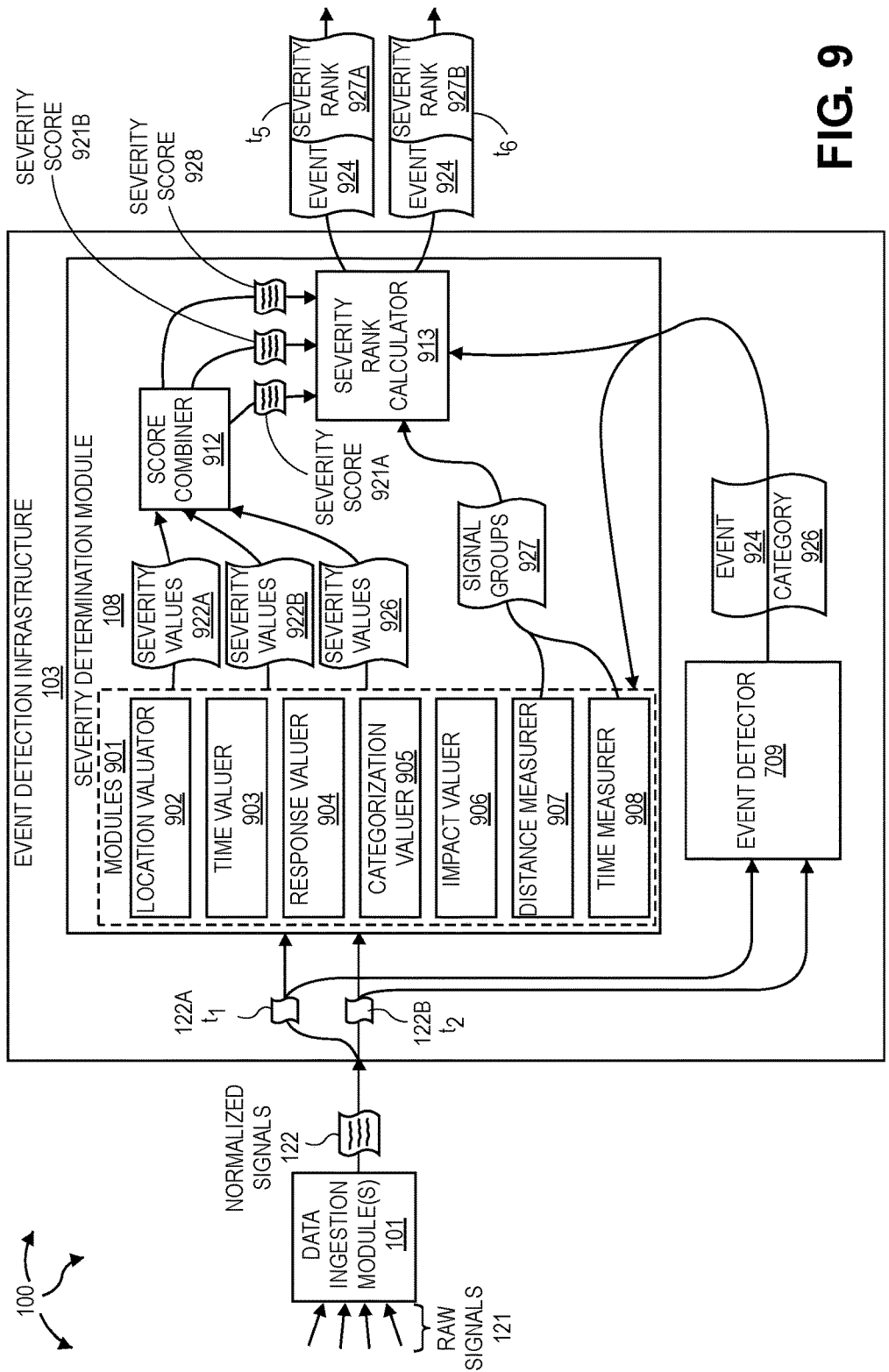
FIG. 9 illustrates a more detailed view of severity determination module.

FIG. 9 illustrates a more detailed view of severity determination module 107. Normalized signals 122 received at event detection infrastructure 103 can be sent to severity determination module 108 and event detector 909 (e.g., event detector 709). From one or more normalized signals 122, event detector 209 can detect an event. From one or more normalized signals 122 and detected events, severity determination module 108 can detect the severity of an event.

As depicted, severity determination module 108 includes modules 901, score combiner 913 and severity rank calculator 913. Module 901 further include location valuer 902, time valuer 903, response valuer 904, categorization valuer 905, impact valuer 906, distance measurer 907, and time measurer 908. Location valuer 902 can determine a location severity value for a signal or event based on normalized signal location. Time valuer 903 can determine a time severity value for a signal or event based on normalized signal time. Response valuer 904 can determine a response severity value for a signal or event based on a response to a normalized signal. Categorization valuer 905 can determine a category severity value for a signal or event based on a category of a normalized signal. Impact valuer 906 can determine an impact severity value for a signal or event based on an impact associated with a normalized signal. Distance measurer 907 can determine a physical distance between different normalized signals. Time measurer 908 can determine a time distance between different normalized signals. Distance measurer 907 and time measure 908 can interoperate to detect signal bursts and group signals.

When available, any of a location severity value, a time severity value, a response severity value, a category severity value, an impact severity value can be sent to score combiner 912. Score combiner 912 can combine received values and into a signal severity score or an event severity score. Score combiner 912 can send an event severity score to severity rank calculator 913. Distance measurer 907/time measurer 908 can also indicated signal bursts, signal groups to severity rank calculator 913. Severity rank calculator 913 can calculate a severity rank for an event from one or more event severity scores, indications of signal bursts and/or signal groupings, and possibly also through reference to severity ranks of historical events and signals.

As such, a severity event rank can evolve over time and as additional signals are received.

FIG. 10 illustrates a flow chart of an example method 1000 for determining event truthfulness. Method 1000 will be described with respect to the components and data depicted in FIG. 9.

Method 1000 includes receiving a normalized signal including signal characteristics including a signal type, a signal source, and signal content detecting an event from the content of the first signal (1001). For example, event detection infrastructure 103 can receive normalized signal 122A at time $t_1$. Normalized signal 122A includes type 128A, source 129A, and content 127A. Normalized signal 122A can be forwarded to severity determination module 108 and event detector 909 (which may be event detector 709).

Method 1000 includes detecting an event from the content of the normalized signal (1002). For example, event detector 709 can detect event 924 (e.g., event 724) in category 926 (e.g., category 726) based on the characteristics of normalized signal 122A (a trigger signal) (including any of time 123A, location 124A, context 126A, content 127A, type 128A, sources 129A, etc.) Event detector 909 can send event 924 and category 926 to severity rank calculator 913 and to any of modules 901.

Method 1000 includes calculating a location severity value, a time severity value, a response severity value, a category severity value, and an impact severity value based on a location, time, response, category, and impact respectively associated with the normalized signal (1003). For example, location valuer 902, time valuer 903, response valuer 904, categorization valuer 905, and impact valuer 906 can each calculate a corresponding severity value for signal 122A, collectively represented as severity values 922A. Distance measurer 907 can determine and store the location of signal 122A. Time measurer 908 can determine and store an origination time of signal 122A.

Method 1000 includes calculating a severity score for the normalized signal based on the location severity value, the time severity value, the response severity value, the category severity value, and the impact severity value (1004). For example, score combiner 912 can combine severity values 922A into severity score 921A. Score combiner 912 can send severity score 921A to severity rank calculator 913.

Method 1000 includes calculating an event severity rank for the event from the severity score (1005). For example, severity rank calculator 913 can calculate severity 927A for event 924 from severity score 921A. Method 1000 includes sending the event and the event severity rank to an event notification module (1006). For example, event detection infrastructure 103 can send event 924 along with severity rank 927A to event notification at time $t_5$.

Method 1000 includes receiving a second normalized signal including second signal characteristics including a second signal type, a second signal source, and second signal content (1007). For example, event detection infrastructure 103 can receive normalized signal 122B at time $t_2$. Normalized signal 122B includes type 128B, source 129B, and content 127B. Normalized signal 122B can be forwarded to severity determination module 108 and event detector 909 (which may be event detector 709).

Method 1000 includes determining that the second normalized signal is associated with the event (1008). For example, event detector 909 can determine that normalized signal 122B is associated with event 924.

Method 1000 includes calculating a second location severity value, a second time severity value, a second response severity value, a second category severity value, and a second impact severity value based on a location, time, response, category, and impact respectively associated with the second normalized signal (1009). For example, location valuer 902, time valuer 903, response valuer 904, categorization valuer 905, and impact valuer 906 can each calculate a corresponding severity value for signal 122B, collectively represented as severity values 922B. Distance measurer 907 can determine and store the location of signal 122B. Time measurer 908 can determine and store an origination time of signal 122B. Based on locations and origination times, distance measurer 907/time measurer 908 can determine that normalized signals 922A and 922B are in a signal group 927 (and possibly part of a signal burst).

Method 1000 includes calculating a second severity score for the second normalized signal based on the second location severity value, the second time severity value, the second response severity value, the second category severity value, and the second impact severity value (1010). For example, score combiner 912 can combine severity values 922B into severity score 921B. Score combiner 912 can send severity score 921B to severity rank calculator 913. Distance measurer 907/time measurer 908 can also send signal groups 927 to severity rank calculator 913.

Method 1000 includes calculating an updated event severity rank for the event from the first severity score and the second severity score (1011). For example, severity rank calculator 913 can calculate severity 927B for event 924 from severity score 921A, severity score 921B, and signal groups 927 (and/or one or more signal bursts). Method 1000 includes sending the event and the updated event severity rank to the event notification module (1012). For example, event detection infrastructure 103 can send event 924 along with severity rank 927B to event notification at time $t_6$.

In one aspect, event 924 is sent to severity determination module 108.

Location valuer 902, time valuer 903, response valuer 904, categorization valuer 905, and impact valuer 906 can calculate severity values 926 from characteristics of event 224. Distance measurer 907 can determine and store the location of event 924. Score combiner 912 can combine severity values 926 into severity score 928. Score combiner 912 can send severity score 928 to severity rank calculator 913. Severity rank calculator 913 can calculate an additional severity rank for event 224 from severity score 921A, severity score 921B, severity score 928, and signal groups 927. Event detection infrastructure 103 can send event 224 with the additional severity rank to event notification 116.

In some aspects, signals are grouped into social (Facebook, Instagram, Twitter, etc.) and non-social (EMS radio communication, CAD, Traffic Cameras, etc.). Individual signals can be valued based on severity rank evaluation (e.g., CAD (computer aided dispatch) and Traffic Camera signals rank higher than Twitter/FB source signals). Geofences can be generated based on available signals. The geofences can then be used to monitor correlating signals and thus can be used to improve severity rank on a continuous basis.

In one aspect, criteria used for a severity assessment include signal/event location, signal/event time, event response (dispatch code, nature of 911 call, etc.), event categorization, event related signal volume, such as, count of signals, detection of bursts of social signals/events, etc., and event impact (e.g., people/property impacted).

A weighted average module (e.g., integrated into and/or spanning score combiner 912 and/or severity rank calculator 913) can be used to determine event severities.

Location Rank (L1): location groups (cities, schools, hospitals, places of interest etc.)

Time Rank (T1): time of occurrence which can directly influence the severity

Response Rank (R1): Priority Dispatch Codes, and whether it's fire, police, or medical, or all of them+SWAT can correspond to higher ranks Category Rank (C1): Fire, Accident, Explosion, etc. can have a higher severity rank than certain other event categories Signal Rank (S1): Rank signal groups based on historical observations Impact Rank (I1): Rank keywords (Killed, Hurt, Hospitalized, SWAT, Shots Fired, Officer Shot, Biohazard, Terrorism, etc.)—places keywords (subway stations, airports, Whitehouse, etc. have higher ranks)

Wherein, Event Severity Rank=(L1*W1)+(T1*W2)+(C1*W3)+(S1*W4)+(I1*W5) and W1, W2, Wn, etc. represent corresponding weights. Weights can be derived dynamically using machine learning models built on an historical events database (i.e., derived based on historical event dissections). Event Severity can be normalized to derive a Severity Rank (e.g., score between 1 and 5, range of "low", "medium", or "high", etc.)

Severity determination module 108 can operate concurrently with truthfulness determination module 107 and other modules includes in event detection infrastructure 103.

Event Identification and Notification Based on Entity Preferences

Aspects of the invention identify relevant events and notify entities of relevant events based on entity selected event notification preferences. Entities indicate event notification preferences to an event notification service. An event detection infrastructure detects events based on received signals. The notification service monitors detected events. For each detected event, the notification service compares characteristics of the detected event to event notification preferences for one or more entities. Based on the comparisons, the event notification service determines if an event satisfies event notification preferences for any entities. The event notification service notifies entities having satisfied event notification preferences about the event. Components that facilitate identifying relevant events and notifying entities of relevant events can be integrated with data ingestion modules and an event detection infrastructure.

Detected events can be of interest to entities, such as, for example, parents, guardians, teachers, social workers, first responders, hospitals, delivery services, media outlets, government entities, government agencies, etc. based on event characteristics, such as, for example, a combination of one or more of: event location, event category, event truthfulness, and event severity. For example, a teacher may be interested in shooting and police presence events at and within a specified of distance of a school where they work regardless of truthfulness, severity, or when the event occurred. On the other hand, a parent may be interested in shooting events at the school having at least a specified truthfulness and regardless of severity and time but not interested in shootings in the surrounding area and not interested in other police presence events at the school.

To be notified of events they deem relevant, entities can indicate event notification preferences at a user interface. The user interface can include controls for indicating location preferences, distance range preferences, event category preferences, event truthfulness preferences, event severity preferences, and event time preferences. An entity can select various preferences through the user interface to define events of interest to the entity. A preference can be indicated as a less than, a less than or equal to, a greater than, a greater than or equal to, or equals, as well as combinations thereof.

For example, an entity may be interested in accidents (event category preference), within 5 miles of their house (location preference and distance range preference), having at least an 80% probability to be true (truthfulness preference), having a specified severity (severity preference), and that occurred in the last 30 minutes. Severity may be considered as a gradient. For example, for accidents: one vehicle, no injuries (severity 1), one vehicle and minor injuries (severity 2), multiple vehicles or a serious injury, (severity 3), life threatening injuries (severity 4), fatalities (severity 5). If the entity is interested in information impacting their commute, they may prefer notification about any accidents and can indicate notification for accidents of severity 1 or greater. On the other hand, a firehouse may be interested in accidents of severity 3 or greater, for example, where medical and/or occupant extraction services may be needed.

An entity may be interested in different categories of events in and/or around multiple different locations that having at least a specified truthfulness and/or that have at least a specified severity and/or may desire event notification within a specified time of event detection. As such, an entity can enter multiple different sets of preferences.

Entity event notification preferences can be stored in a preferences database. Each set of preferences for an entity can be stored along with an entity ID for the entity.

When the event identification module receives a detected event, the event identification module can compare characteristics of the event to different sets of entity event notification preferences. When the characteristics of an event satisfy a set of entity preferences associated with an entity, the event and an entity ID of the entity are sent to an event notification module. If characteristics of an event satisfy multiple sets of entity preferences, the event and entity IDs for each associated entity are sent to the event notification module.

The event notification module refers to notification preferences, to determine how to notify an entity. An entity can be notified via email, via text message, through other messaging infrastructures, by storing an event in durable storage, etc. An event can be formatted for compatibility with entity systems. For example, an event can be stored in a data format requested by an entity. In one aspect, an event detecting in a format used by one entity. The even can be translated into a format used by another entity. As such the meaning of the event can be translated from the one entity to the other entity. A time preference can indicate a desire to be notified of an event within a specified time of event detection. In one aspect, the specified time ranges from live-time (essentially a preference to be notified concurrently with event detection) to 60 minutes.

Figures 1, 11A:
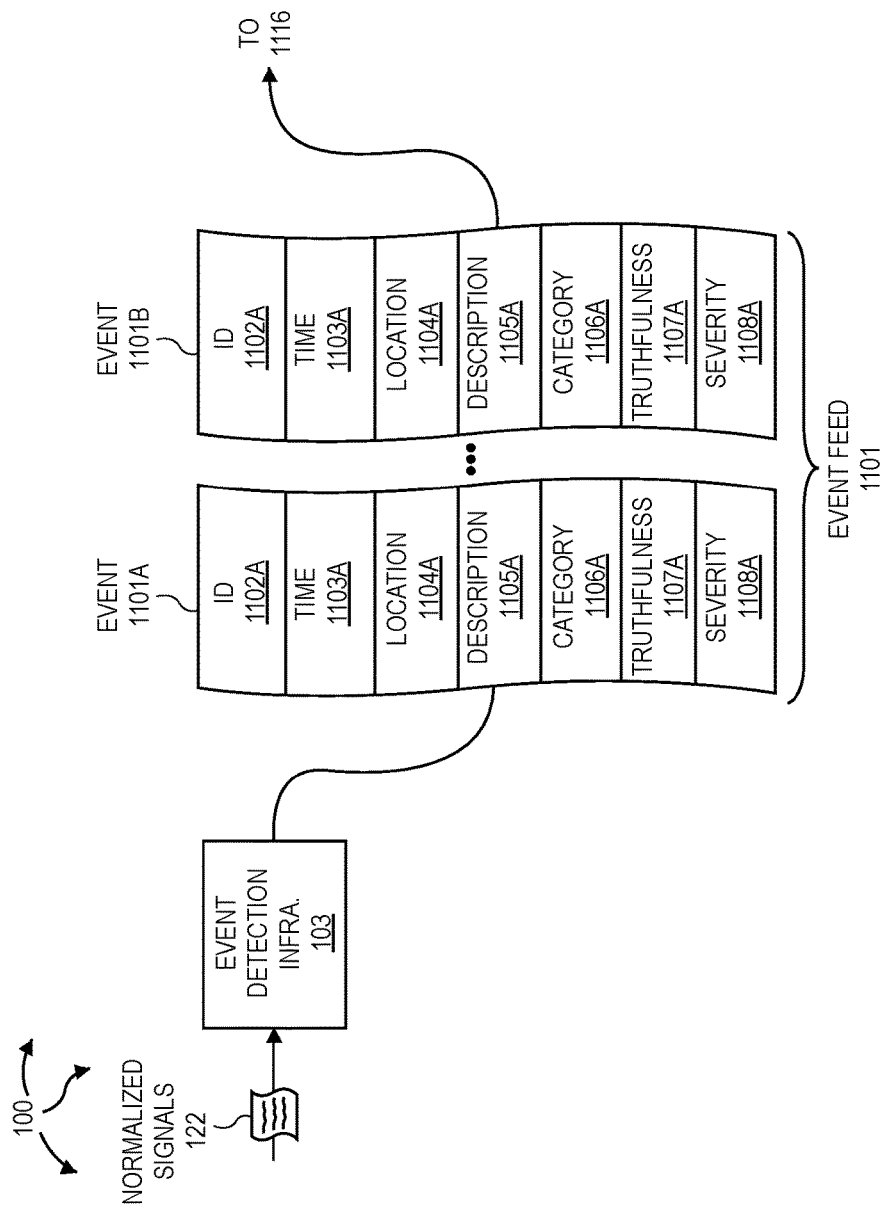
Figures 2, 11A:
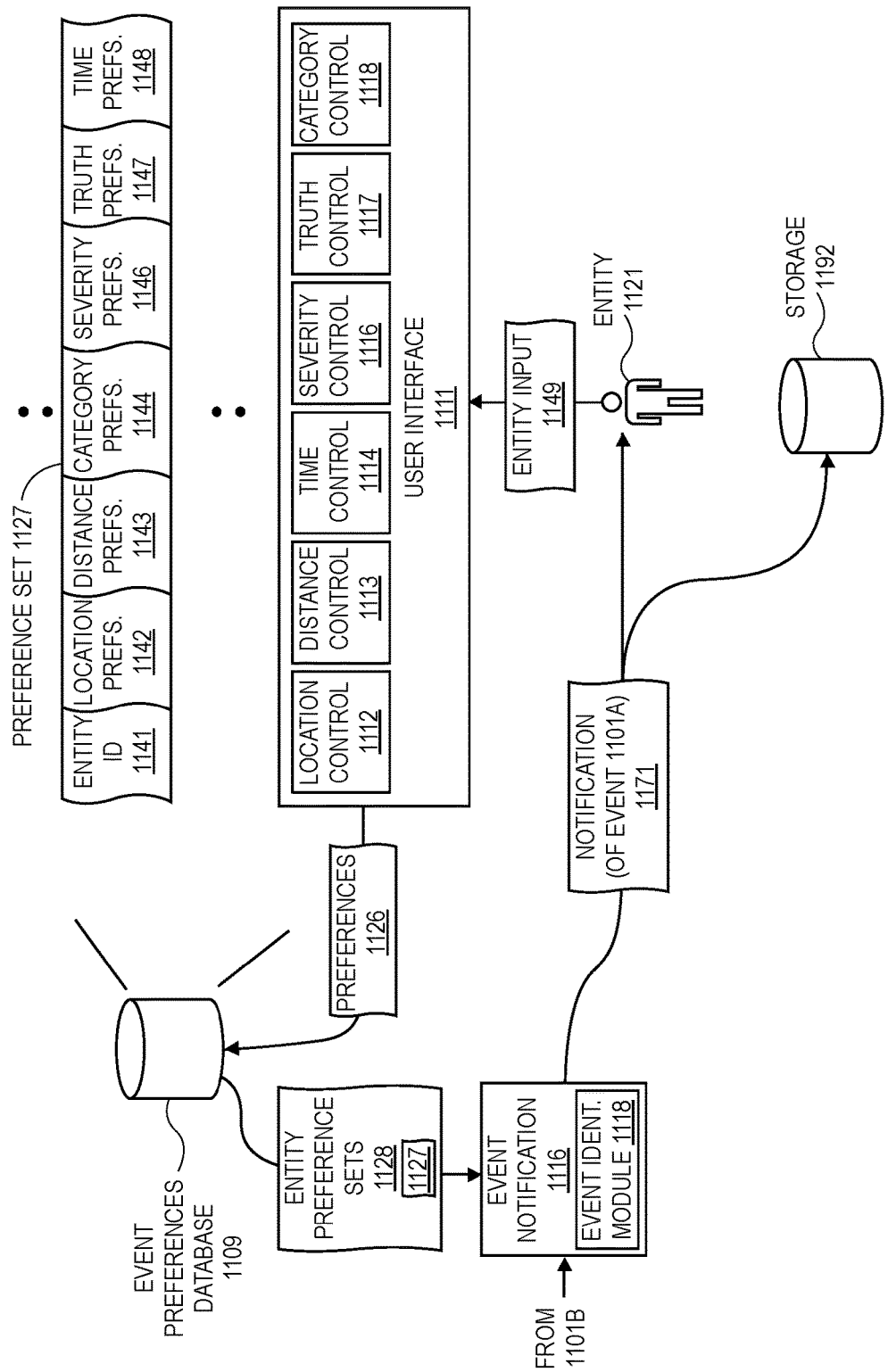

FIGS. 11A-1 and 11A-2 illustrate a computer architecture that facilitates identifying relevant events and notifying entities of relevant events. In one aspect, event detection infrastructure 103 generates event feed 1101. Event feed 1101 includes detected events, including event 1101A, event 1101B, etc. Each event can include an event ID, a time, a location, a description, a category (or categories)(i.e., context), a truthfulness, and a severity. For example, event 1101A includes ID 1002A, time 1103A, location 1104A, description 1105A, category (or categories) 1106A, truth 1107A, and severity 1108A. Similarly, event 1101B includes ID 1102B, time 1103B, location 1104B, description 1105B, category (or categories) 1106B, truth 1107B, and severity 1108B.

Event detection infrastructure 103 can send event feed 1101 to event notification 116.

As depicted in FIG. 11A-2, user interface 1111 includes location control 1112, distance control 1113, time control 1114, severity control 1116, truth control 1117, and category control 1118. Location control 1112 can be used to select locations of interest to an entity. Distance control 1113 can be used to select a distance from (e.g., a radius or other shape around) a selected location or define an area that is of interest to the entity. Location control 1112 and distance control 1113 can be utilized in tandem to indicate any of: a distance from a fixed location, a geo fenced area, or specific types of locations contained in a geo fenced area.

Category control 1118 can be used to select event categories (i.e., context) of interest to an entity. Time control 1114 can be used to indicate a time frame (e.g., 1, 5, 10, 15, or 30 minutes) in which an entity wishes to be notified of events after event detection. The time frame can be defined as an event age after which there is no longer interest in being notified of events that otherwise satisfy entity notification preferences. In one aspect, time control 1114 is used to indicate an interest in being notified of events in "live time" or essentially at "moment zero". In another aspect, time control 1114 is used to indicate an interest in being notified of events within 60 minutes of detection. Severity control 1116 can be used to indicate event severities of interest to the user. Truth control 1117 can be used to indicate event truthfulness of interest to the user.

Other times settings can be configured to indicate when the user desires to be notified. For example, a user may be interested in events that are detected in "live time" or essentially at "moment zero" but wants to be notified on the hour, once a day, etc.

User interface 1111 can also include controls for identifying entities to be notified when event notification preferences are satisfied. For example, an entity selecting event notification preferences can select a preference to notify themselves and/or others of relevant events. User interface 1111 can also include controls enabling an entity to select notification mechanisms, such as, text message, email, data file, etc. per entity that is to be notified.

The depicted controls as well as other indicated controls of user interface 1111 can be graphical user interface controls including any of: check boxes, radio buttons, dials, sliders, text entry fields, etc.

Entity 1121 can enter entity input 1149 at user interface 1111 to formulate preferences 1126. Entity 1121 can select, adjust, manipulate, etc. one or more of location control 1112, distance control 1113, time control 1114, severity control 1116, truth control 117, and category control 1118 to formulate preferences 1126. Entity 1121 can also select one or more notification mechanisms at user interface 1111. When entity 1121 completes preference selection, user interface 1111 can store preferences 1126 as preference set 1127 in event preferences database 1109.

As depicted, preference set 1127 includes entity ID 1141 (of entity 1121), location preferences 1142 (e.g., indicating a location of interest or an area of interest), distance preferences 1143, category preferences 1144, severity preferences 1146, truth preferences 1147, and time preferences 1148. For example, preference set 1127 can indicate that entity 1121 is interested in police presence events (category) within one mile of a high school (location and distance) within 5 minutes of detection (time preference), that have at least a specified severity, that have a 50% or greater probability of being true.

Time preferences 1148 can indicate interest in events less than or equal to a maximum age (and that otherwise meet entity notification requirements). In one aspect, time preferences 1148 indicate that entity 1121 desires to be notified of relevant events detected in "live time" or essentially at "moment zero" (and that otherwise satisfied entity notification preferences). In another aspect, time preferences 1148 indicate that entity 1121 desires to also be notified of relevant events detected within some amount time after moment zero, for example, in range between 1 and 60 minutes (and that otherwise satisfied entity notification preferences).

For example, an entity may register to be notified of events that are less than 30 minutes old and have truthfulness (e.g., confidence level) threshold of at least 75%. At "moment zero" can event may be detected and have an associated truthfulness (confidence level) of 40%. The entity is not notified of the event because the truthfulness does not satisfy the truthfulness threshold. 35 minutes later another signal is received raising the associated truthfulness (confidence level) to 80%. However, the entity is still not notified of the event because the entity is not interested in events that are older than 30 minutes, In one aspect, an application is installed on a mobile phone used by entity 1121. User interface 1111 is included in the application. In another aspect, user interface 1111 is a web-based interface access by entity 1121 using a browser.

Entity 1121 can utilize user interface 1111 to formulate other preference sets. Other users can also utilize user interface 1111 or other similar user interfaces to formulate additional preference sets (e.g., at their mobile phones).

From time to time, or on an ongoing basis, event identification module 118 can access entity preference sets 1128, including preference set 1127, from event preferences database 1109. As event identification module 118 receives events, identification module 118 filters event feed 1101 to identify events that entities have defined as relevant in preference sets. Event identification module 118 compares characteristics of received events to entity preference sets 1128 to determine if events satisfy any event preference sets.

Figure 12A:
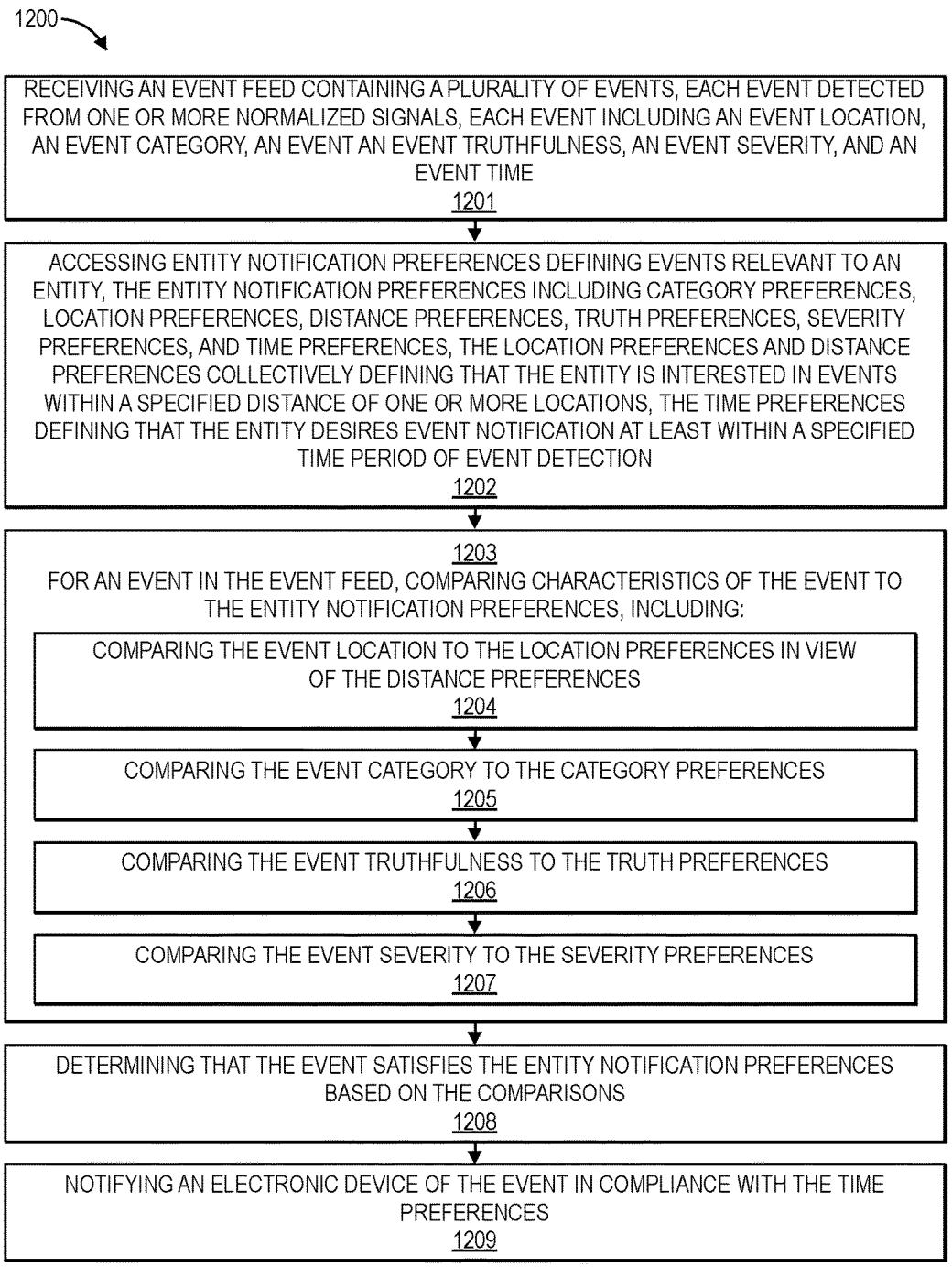
FIG. 12A illustrates a flow chart of an example method for identifying relevant events and notifying entities of relevant events.

FIG. 12A illustrates a flow chart of an example method 1200 for identifying relevant events and notifying entities of relevant events. Method 1200 will be described with respect to the components and data depicted in FIG. 11A.

Method 1200 includes receiving an event feed containing a plurality of events, each event detected from one or more normalized signals, each event including an event location, an event category, an event an event truthfulness, an event severity, and an event time (1201). For example, event notification 116 can receive event feed 1101, including events 1101A, 1101B, etc.

Method 1200 includes accessing entity notification preferences defining events relevant to an entity, the entity notification preferences including category preferences, location preferences, distance preferences, truth preferences, severity preferences, and time preferences, the location preferences and distance preferences collectively defining that the entity is interested in events within a specified distance of one or more locations, the time preferences defining that the entity desires event notification at least within a specified time period of event detection (1202). For example, from time to time, or on an ongoing basis event identification module 118 can access entity preference sets 1128, including preference set 1127, from event preferences database 1109.

Method 1200 includes for an event in the event feed, comparing characteristics of the event to the entity notification preferences (1203). For example, as event notification 116 receives event feed 1011, identification module 118 filters event feed 1101 to identify events that entities have defined as relevant in preference sets. Event identification module 118 compares characteristics of received events to entity preference sets 1128 to determine if events satisfy any event preference sets. For example, event identification module 118 can compare the characteristics of event 1101A to preference set 1127.

More specifically, method 1200 includes comparing the event location to the location preferences in view of the distance preferences (1204), comparing the event category to the category preferences (1205), comparing the event truthfulness to the truth preferences (1206), and comparing the event severity to the severity preferences (1207). For example, event identification module 118 can compare location 1104A to location preferences 1142 in view of distance preferences 1143, can compare category (or categories) 1106A to category preferences 1144, can compare truthfulness 1107A to truth preferences 1147, and can compare severity 1108A to severity preferences 1148.

Method 1200 includes determining that the event satisfies the entity notification preferences based on the comparisons (1208). For example, event identification module 118 can determine that event 1101A satisfies preference set 1127. Method 1200 includes notifying an electronic device of the event in compliance with the time preferences (1209). For example, event notification 116 can send notification 1171 (of event 1101A) to an electronic device (e.g., a mobile phone) associated with entity 1121 in compliance with time preferences 1148. Event notification 116 can also store notification 1171 at storage 1192. In one aspect, notification 1171 is sent essentially at "moment zero" or in "live-time". In another aspect, notification 1171 is sent after a configured delay, for example, between zero and 60 minutes.

In one aspect, notification 1171 includes at least some content from event 1101A, such as, for example, time 1103A, location 1104A, description 1105A, and category (or categories) 106A. Entity 1121 may use storage 1192 to store relevant events over a period of time and subsequently use the stored events in other data processing operations.

If event identification module 118 determines that event 1101A satisfies other additional preference sets, notifications can be set to entities corresponding to those preferences sets. Event notification module 116 can notify other entities in accordance with their notification preferences.

Event identification module 1118 through interoperation with event detection infrastructure 103, event preferences database 1109, and event notification 116, essentially functions as a controller of live data. Accordingly, aspects of the invention allow entities to tailor event notifications to their specific needs and desires and receive event notifications for events they deem relevant (without being bombarded with irrelevant events) in a timely manner.

In other scenarios, an entity and/or their associates, related entities, such as, security personnel, etc. may be interested in events at or around the entity's current location and/or events at or around locations the entity may visit in the near future. The entity and/or their associates, related entities, etc. may interested in events on an ongoing basis, including updates as the entity moves between different locations. For example, a person travelling may be interested in events ahead of them on the highway that might slow down their travel. Government officials/corporate executives and/or their security personnel may be interested in events posing a threat of physical injury to the government officials/corporate executive at a location or in transit between locations. First responders may be interested in medical, fire, or law enforcement related events near their location to more quickly provide relevant services. An air traveler may be interested in events at their destination.

Aspects of the invention identify relevant events and notify entities (or their associates, related entities, etc.) of relevant events based on current location or predicted future location of an entity, for example, to provide situational awareness about the entity's current or future surroundings. Current entity location as well as probable future entity locations can be considered when determining event relevancy. Current location and probable future location can be derived from entity location information. Entity location information can be expressly defined and/or inferred from other information about the entity.

In one aspect, a current location of an entity is determined from expressly defined and/or inferred entity location information. The entity (or their associates, related entities, etc.) is sent event notifications to notify the entity (or their associates, related entities, etc.) of relevant events at or near the entity's current location. The entity's current location can be determined, and event notifications sent to the entity (or their associates, related entities, etc.) on an ongoing basis to update the entity (or their associates, related entities, etc.) as the entity moves between locations.

In another aspect, expressly defined and/or inferred entity location information is used to predict, derive, etc., the entity's possible/probable future location(s). The entity (or their associates, related entities, etc.) is sent event notifications to notify the entity (or their associates, related entities, etc.) about relevant events at or near the entity's possible/probable future location(s). Changes to an entity's possible/probable future location(s) can be predicted, derived, etc., on an ongoing basis as expressly defined location information and/or inferred location information for an entity changes. As possible/probable future location(s) change, the entity (or their associates, related entities, etc.) is sent event notifications to update the entity (or their associates, related entities, etc.) about relevant events at or near the changed future location(s).

As described, entities can indicate event notification preferences to an event notification service. An event detection infrastructure detects events based on received signals. The notification service monitors detected events. For each detected event, the notification service compares characteristics of the detected event to event notification preferences for one or more entities. Based on the comparisons, the event notification service determines if an event satisfies event notification preferences for any entities. The event notification service notifies entities having satisfied event notification preferences about the event.

Location control 1112 and distance control 1113 can be utilized in tandem to indicate preferences for being notified of events at an entity's current location and/or for being notified of events at an entity's probably future location(s). Also as described, user interface 1111 can include controls for identifying entities to be notified when event notification preferences are satisfied. For example, an entity selecting event notification preferences can select a preference to notify themselves and/or others of relevant events.

In one aspect, an entity registers event notification preferences indicating a desire to be notified of events at or near the entity's current location and/or to be notified of events at or near the entity's predicted future locations. Alternatively, and/or in combination, an entity (e.g., a protectee) registers event notification preferences indicating a desire that another entity (e.g., the protectee's security personnel) be notified of events at or near the entity's current location and/or to be notified of events at or near the entity's predicted future locations. In a further aspect, an entity (e.g., a protectee's security personnel) registers notification preferences indicating a desire to be notified of events at or near another entity's (e.g., the protectee) current location and/or to be notified of events at or near the other entity's predicted future locations. User interface controls associated with location and distance preferences can be used to define an interest in events at or within a specified distance of an entity's current location and/or at or within a specified distance of the entity's probably future location(s). The event notification service can then notify an appropriate entity or entities of relevant events at or near an entity's current location and/or at or near the entity's possible/probable future location(s) as appropriate.

For example, an entity may be interested in accidents (event category preference), within one mile of their current location as they are driving (location and distance range preference), having at least an 75% probability to be true (truthfulness preference), of any severity (severity preference), and desires event notification of accident that occurred within the last hour (time preference). In another example, an entity on an airplane may be interested in demonstrations (event category preference) in a city where they will be landing within the next hour (location and time preference), having at least a 70% probability to be true (truth preference), and having moderate severity (severity preference). As a further example, a police officer in his/her patrol car may be interested in any crime related events (event category preference) within a half-mile of his/her current location on an ongoing basis as he/she patrols (location and distance range preference), having at least a 60% probability to be true (truth preference), having high severity (e.g., crimes against person) (severity preference), and desires event notification of events that occurred in the last 5 minutes (or in "live time")(time preference).

If there is an interest in events within a specified distance of an entity's current location, a location awareness module can access location data and/or other location related data corresponding to and/or shared by the entity. The location awareness module uses the location data and/or the other location related data to determine (or at least estimate) the entity's current location. In some aspects, location data (e.g., coordinates of a mobile phone, coordinates of a connected vehicle, location data from a location service, etc.) expressly defines the entity's current location. The location awareness module calculates the entity's location from the location data.

In other aspects, other location related data, such as, for example, navigation maps, map routing data, navigational data, calendar data, travel itineraries, social media data, indirectly indicate an entity's location. The location awareness module infers the entity's current location from the other location related data. In one aspect, artificial intelligence and/or machine learning is used to infer an entity's current location from other location related data.

In general, an event identification module can compare an event location to an entity's current location to determine if an event is relevant to the entity (e.g., in accordance with distance preferences). In one aspect, artificial intelligence and/or machine learning is used to determine if an event is relevant to an entity based on current location.

If there is an interest in events within a specified distance of an entity's future location(s), the location awareness module can access location data and/or other location related data corresponding to and/or shared by the entity. The location awareness module predicts probable future locations of the entity from the location data and/or other location related data. In one aspect, artificial intelligence and/or machine learning is used to infer an entity's probable future location(s) from the location data and/or other location related data. For example, from a flight itinerary, the location awareness module can infer that an entity is to land at a destination in a specified period of time. In another example, from a current location on a highway, vehicle speed, and a map route, the location awareness module can infer that an entity is to arrive in a particular town in a specified period of time.

The event identification module can compare an event location to an entity's probably future location(s) to determine if an event is relevant to the entity (e.g., in accordance with distance preferences). In one aspect, artificial intelligence and/or machine learning is used to determine if an event is relevant to the entity based on probable future location(s).

An event notification module refers to notification preferences, to determine how to notify an entity (either about events relevant to them or events relevant to another entity). An entity can be notified via email, via text message, through other messaging infrastructures, by storing an event in durable storage, etc. An event can be formatted for compatibility with entity systems. For example, an event can be stored in a data format requested by an entity.

Figure 11B:
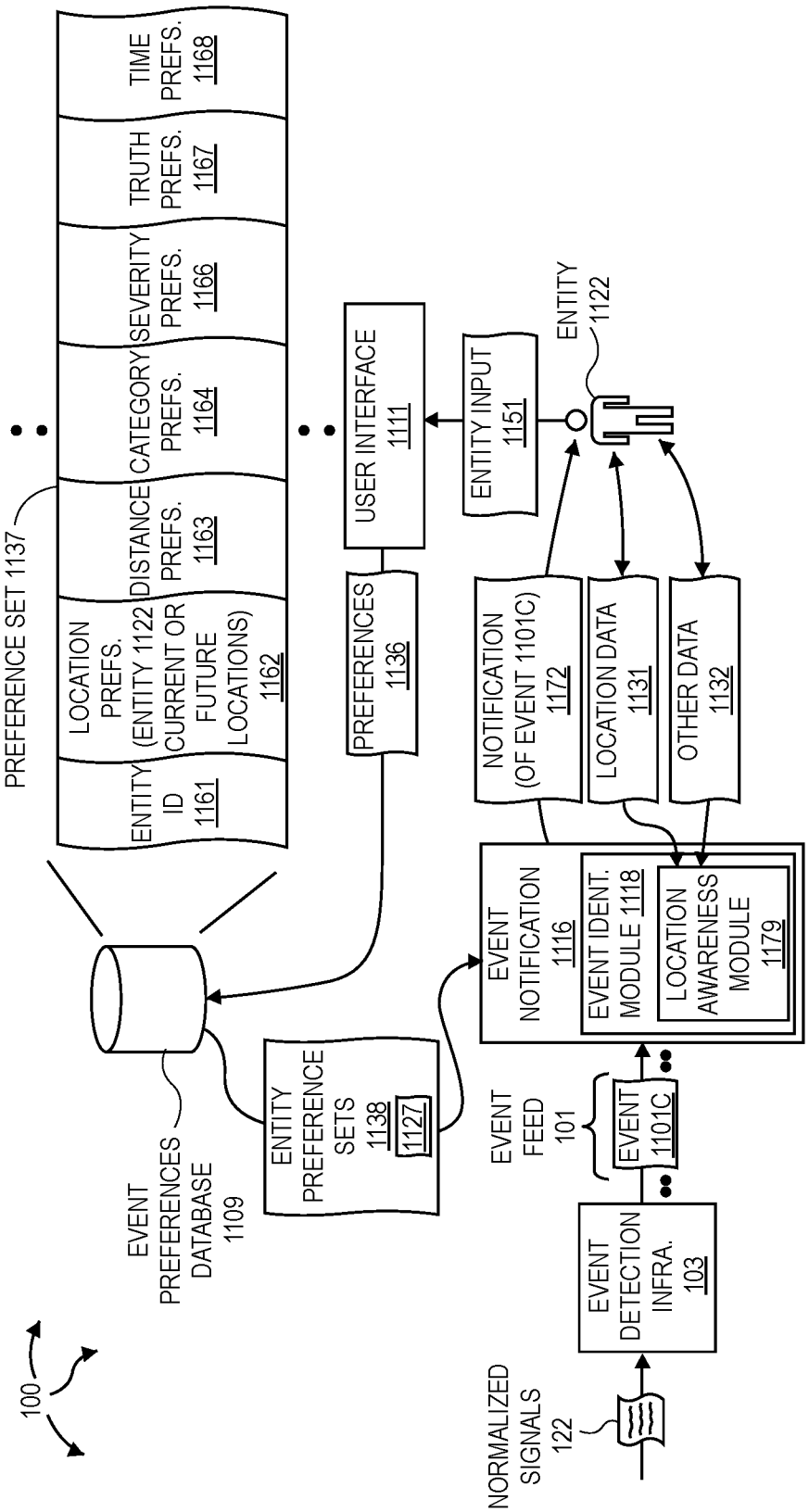
FIG. 11B illustrates a computer architecture that facilitates identifying relevant events and notifying entities of relevant events.

FIG. 11B illustrates a computer architecture that facilitates identifying relevant events and notifying entities of relevant events. As depicted in FIG. 11B, event identification module 1118 includes location awareness module 1179. In general, location awareness module 1179 can access location data and/or other (location related) data for an entity. Location awareness module 1179 can (possibly using artificial intelligence and/or machine learning) determine (or at least estimate) a current location of the entity from the location data and/or other (location related) data. Location awareness module 1179 can also (possibly using artificial intelligence and/or machine learning) predict (or at least estimate) probable future location(s) of the entity from the location data and/or other (location related) data As described, user interface 1111 includes location control 1112, distance control 1113, time control 1114, severity control 1116, truth control 1117, and category control 1118. The various controls can be manipulated by an entity to enter event notification preferences. Also as described, user interface 1111 can include controls enabling an entity to select notification mechanisms, such as, text message, email, data file, etc.

Entity 1122 can enter entity input 1151 at user interface 1111 to formulate preferences 1136. Entity 1122 can select, adjust, manipulate, etc. one or more of location control 1112, distance control 1113, time control 1114, severity control 1116, truth control 117, and category control 1118 to formulate preferences 1126. Entity 1122 can also select one or more notification mechanisms at user interface 1111. When entity 1122 completes preference selection, user interface 1111 can store preferences 1136 as preference set 1137 in event preferences database 1109.

Time preferences 1168 can indicate a time delay after which a notification for a relevant event can be sent. In one aspect, time preferences 1168 indicate that entity 1121 desires to be notified of relevant events in "live time" or essentially at "moment zero". In another aspect, time preferences 1168 indicate that entity 1122 desires to be notified of relevant events after a time delay of between zero and 60 minutes.

As depicted, preference set 1137 includes entity ID 1161 (of entity 1121), location preferences 1162 (e.g., indicating interest in events at entity 1122's current and/or probable future locations), distance preferences 1163, category preferences 1164, severity preferences 1166, truth preferences 1167, and time preferences 1168. For example, preference set 1137 can indicate that entity 1122 is interested in police presence events (category) within a specified distance of his or her location (location preference) within 3 minutes of detection (time preference), that have at least a specified severity, that have a 50% or greater probability of being true.

In one aspect, an application is installed on a mobile phone used by entity 11221. User interface 1111 is included in the application. In another aspect, user interface 1111 is a web-based interface access by entity 1122 using a browser.

Entity 1122 can utilize user interface 1111 to formulate other preference sets. Other users can also utilize user interface 1111 or other similar user interfaces to formulate additional preference sets (e.g., at their mobile phones).

From time to time, or on an ongoing basis, event identification module 118 can access entity preference sets 1138, including preference set 1137, from event preferences database 1109. As event identification module 118 receives events, identification module 118 filters event feed 1101 to identify events that entities have defined as relevant in preference sets. Event identification module 118 compares characteristics of received events to entity preference sets 1138 to determine if events satisfy any event preference sets.

Figure 12B:
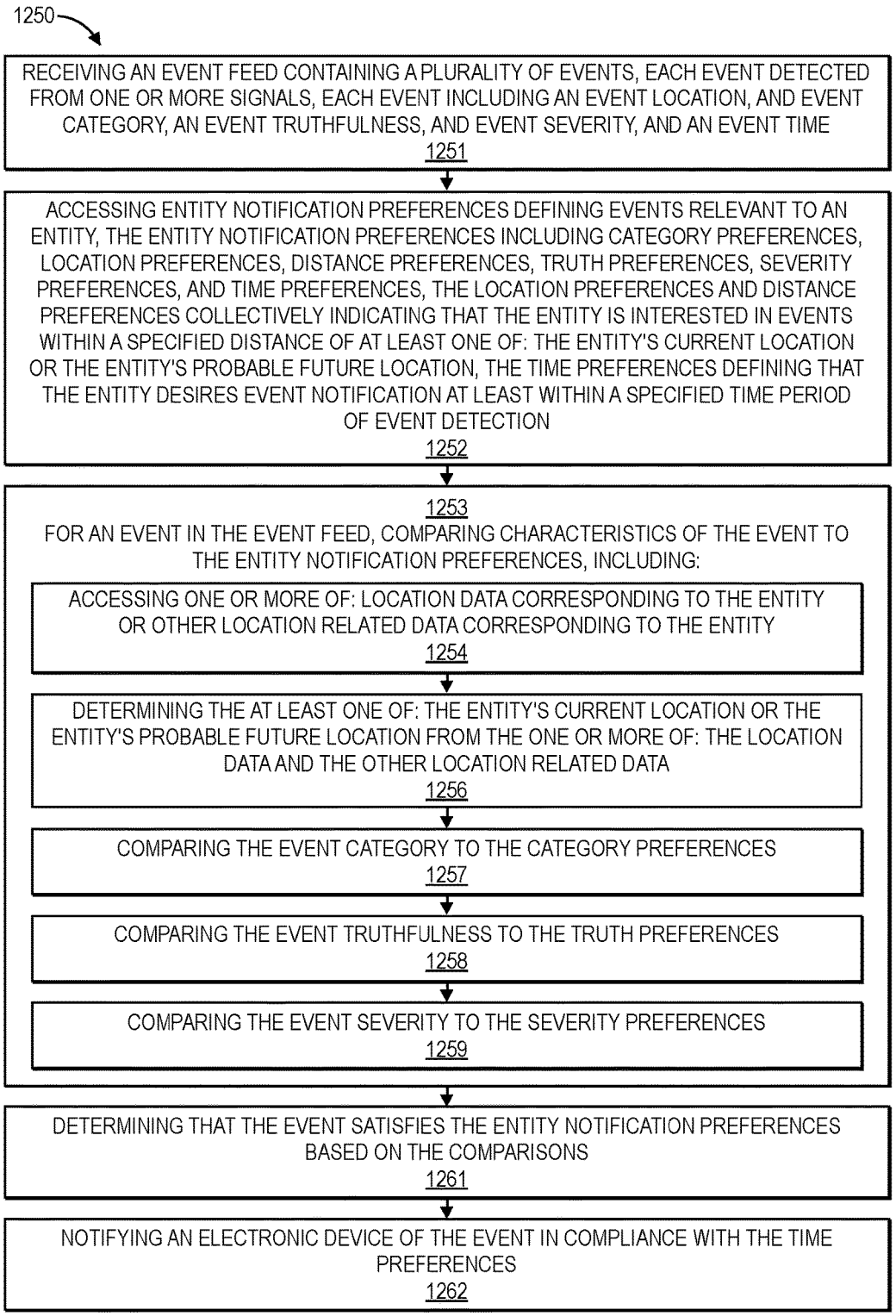
FIG. 12B illustrates a flow chart of an example method for identifying relevant events and notifying entities of relevant events.

FIG. 12B illustrates a flow chart of an example method 1250 for identifying relevant events and notifying entities of relevant events. Method 1250 will be described with respect to the components and data depicted in FIG. 11B.

Method 1250 includes receiving an event feed containing a plurality of events, each event detected from one or more signals, each event including an event location, an event category, an event truthfulness, an event severity, and an event time (1251). For example, event notification 116 can receive event feed 101, including event 1101C.

Method 1250 includes accessing entity notification preferences defining events relevant to an entity, the entity notification preferences including category preferences, location preferences, distance preferences, truth preferences, severity preferences, and time preferences, the location preferences and distance preferences collectively indicating that the entity is interested in events within a specified distance of at least one of: the entity's current location or the entity's probable future location, the time preferences defining that the entity desires event notification at least within a specified time period of event detection (1252). For example, from time to time, or on an ongoing basis event identification module 118 can access entity preference sets 1138, including preference set 1137, from event preferences database 1109.

For an event in the event feed, method 1250 includes comparing characteristics of the event to the entity notification preferences (1253). For example, as event notification 116 receives event feed 1011, identification module 118 filters event feed 1101 to identify events that entities have defined as relevant in preference sets. Event identification module 118 compares characteristics of received events to entity preference sets 1128 to determine if events satisfy any event preference sets. For example, event identification module 118 can compare the characteristics of event 1101C to preference set 1137.

More specifically, method 1250 includes accessing one or more of: location data corresponding to the entity or other location related data corresponding to the entity (1254). Method 1250 includes determining the at least one of: the entity's current location or the entity's probable future location from the one or more of: the location data and the other location related data (1255). Method 1250 includes comparing the event location to the at least one of: the entity's current location or the entity's probable future location (1256).

For example, in one aspect, location preferences 1162 and distance preferences 1163 collective indicate that entity 1122 is interested in events within a specified distance of their current location. In response, location awareness module 1179 accesses location data 1131 and/or other (location related) data 1132. Location awareness module 179 (possibly using artificial intelligence and/or machine learning) determines (or at least estimates) a current location of entity 1122. Event identification module 118 can (possibly using artificial intelligence and/or machine learning) determine if a location indicated in event 1101C is within the specified distance (defined in distance preferences 143) of entity 1122's current location.

In another aspect, location preferences 1162 and distance preferences 1163 collective indicate that entity 1122 is interested in events within a specified distance of their probable future location(s). In response, location awareness module 1179 access location data 1131 and/or other (location related) data 1132. Location awareness module 1179 (possibly using artificial intelligence and/or machine learning) predicts (or at least estimates) probable future location(s) of entity 1122. Event identification module 118 can (possibly using artificial intelligence and/or machine learning) determine if a location indicated in event 1011C is within the specified distance (defined in distance preferences 1163) of entity 1122's probable future location(s).

Method includes comparing the event category to the category preferences (1257), comparing the event truthfulness to the truth preferences (1258), and comparing the event severity to the severity preferences (1259). For example, event identification module 118 can compare a category (or categories) indicated in event 1101C to category preferences 1164, can compare a truthfulness indicated in event 1101C to truth preferences 1167, and can compare a severity indicated in event 1101C to severity preferences 1168.

Method 1250 includes determining that the event satisfies the entity notification preferences based on the comparisons (1261). For example, event identification module 118 can determine that event 1101C satisfies preference set 1137. Method 1200 includes notifying the entity of the event in compliance with the time preferences (1262). For example, event notification 116 can send notification 1172 (of event 1101C) to an electronic device (e.g., a mobile phone) associated with entity 1122 in compliance with time preferences 1168. Event notification 116 can also store notification 1172 in durable storage. In one aspect, time preferences 1168 indicate that notifications are to be sent essentially at "moment zero". As such, event notification 116 can send be configured to send a live-feed of situational awareness regarding entity 1122.

In one aspect, notification 1172 includes at least some content from event 1101C, such as, for example, a time, a location, a description, and a category (or categories). Entity 1122 may use durable storage to store relevant events over a period of time and subsequently use the stored events in other data processing operations.

If event identification module 118 determines that event 1101C satisfies other additional preference sets, notifications can be set to entities corresponding to those preferences sets. Event notification module 116 can notify other entities in accordance with their notification preferences.

Event identification module 1118 and location awareness module 1179 through interoperation with event detection infrastructure 103, event preferences database 1109, and event notification 116, essentially functions as a controller of live data. Accordingly, aspects of the invention allow entities to tailor event notifications to their specific needs and desires and receive event notifications for events they deem relevant (without being bombarded with irrelevant events) in a timely manner.

Figure 13:
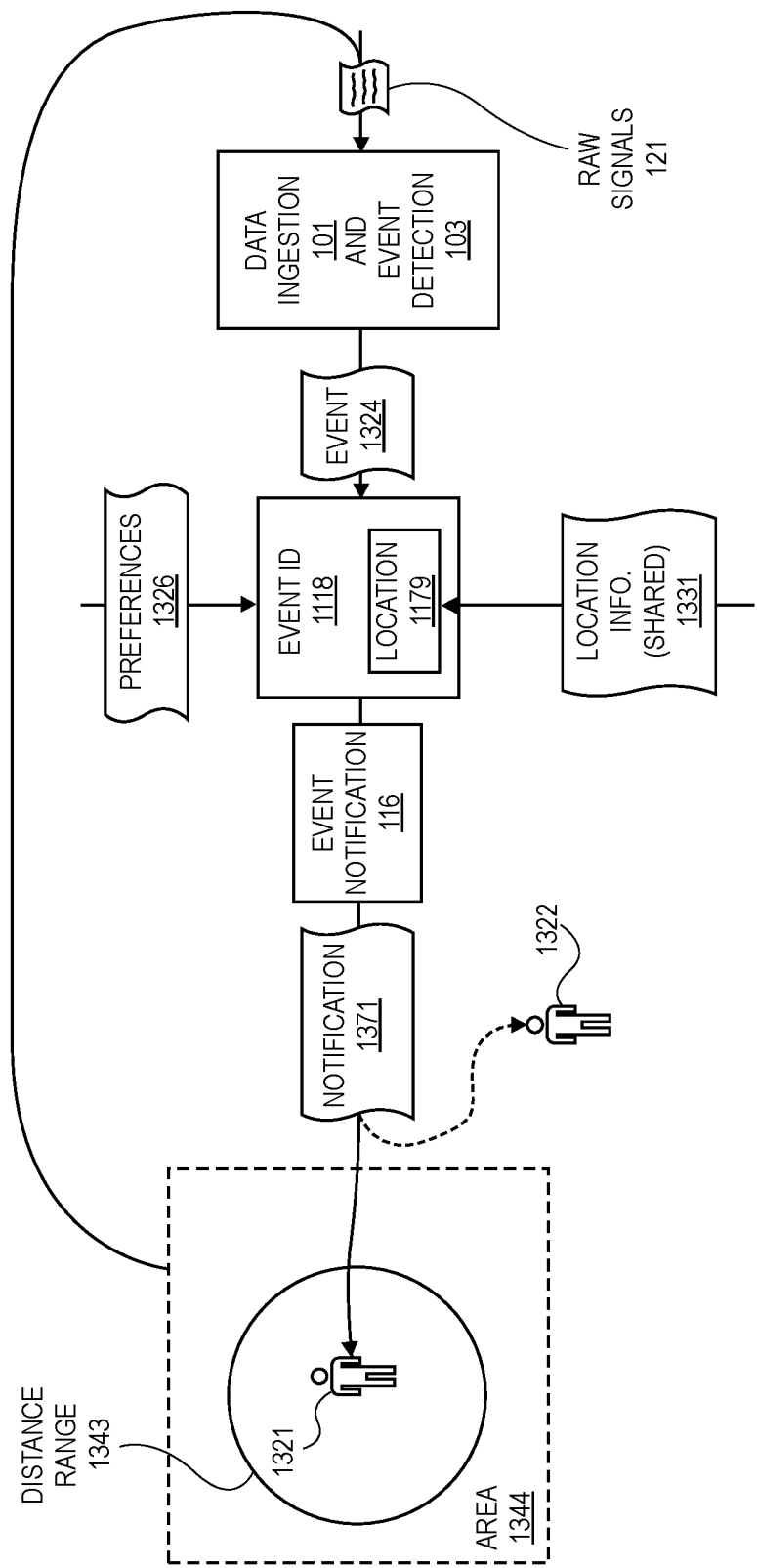
FIG. 13 illustrates a computer architecture that facilitates notifying of an event at or near the current location of an entity.

FIG. 13 illustrates a computer architecture that facilitates notifying of an event at or near the current location of an entity. Entity 1321 can indicate in preferences 1326 (e.g., entered through user interface 1111, 1500, or another similar user interface) a desire to be notified of events within distance range 1343 of entity 1321's current location. Alternately or in combination, entity 1321 can indicate in preferences 1326 a desire to notify entity 1322 of events within distance range 1343 of entity 1321's currently location. In another aspect, entity 1322 indicates in preferences 1326 a desire to be notified of events within distance range 1343 of entity 1321's current location.

From raw signals 121, including raw signals originating in area 1344, data ingestion 101 and event detection 103 can interoperate to detect event 1324. Location awareness module 1179 can access location information 1331 for entity 1321 (e.g., a mobile phone location, travel itinerary, etc.). Location awareness module 1379 can (possibly using artificial intelligence and/or machine learning) derive a current location of entity 1321.

Event identification module 1118 can access preferences 1326. Event identification module 1118 can (possibly using artificial intelligence and/or machine learning) determine that event 1324 is within distance range 1343 of entity 1321 (and otherwise satisfies preferences 1326). Event notification module 116 can send notification 1371 to entity 1321 to notify entity 1321 of event 1324. Alternately or in combination, event notification module 116 can also send notification 1371 (or a different notification) to entity 1322 to notify entity 1322 of event 1324. Notification 1371 can be an electronic message sent to one or more mobile phones.

Figure 14:
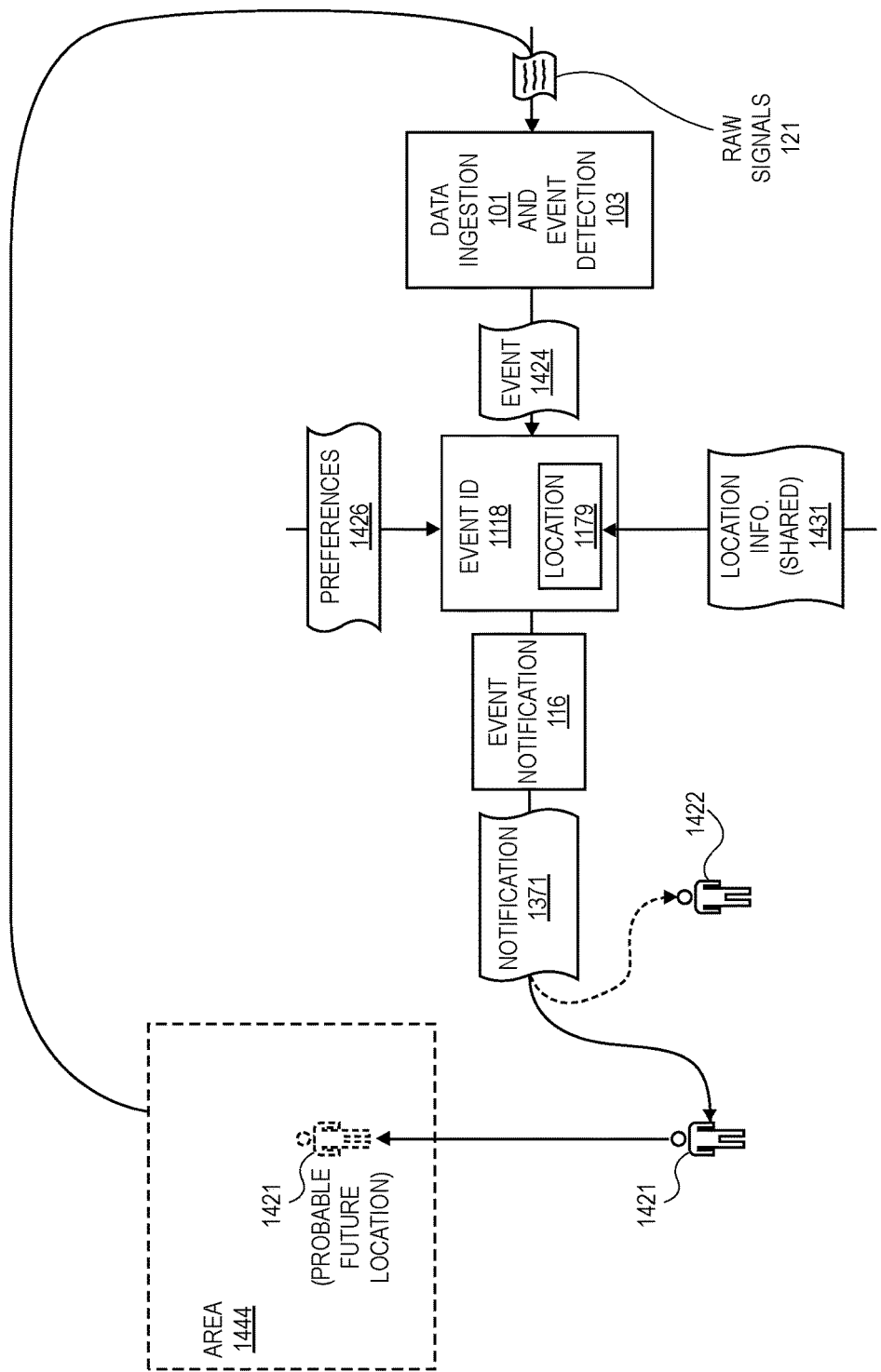
FIG. 14 illustrates a computer architecture that facilitates notifying of an event at or near a predicted future location of an entity.

FIG. 14 illustrates a computer architecture that facilitates notifying of an event at or near a predicted future location of an entity. Entity 1421 can indicate in preferences 1426 (e.g., entered through user interface 1111, 1500, or another similar user interface) a desire to be notified of events within a specified distance range of entity 1421's probably future locations. Alternately or in combination, entity 1421 can indicate in preferences 1426 a desire to notify entity 1422 of events within distance range 1443 of entity 1421's currently location. In another aspect, entity 1422 indicates in preferences 1426 a desire to be notified of events within distance range 1443 of entity 1421's current location.

From raw signals 121, including raw signals originating in area 1444, data ingestion 101 and event detection 103 can interoperate to detect event 1424. Location awareness module 1179 can access location information 1431 for entity 421 (e.g., a speed and direction of travel). Location awareness module 1179 can (possibly using artificial intelligence and/or machine learning) can predict movement of entity 1421 into area 1444 in the future (e.g., in the next 1-3 minutes).

Event identification module 1118 can access preferences 1426. Event identification module 1118 can (possibly using artificial intelligence and/or machine learning) determine that event 1424 is occurring in area 1444 (and otherwise satisfies preferences 1426). Event notification module 116 can send notification 1471 to entity 1421 to notify entity 1421 of event 1424. Alternately or in combination, event notification module 116 can also send notification 1471 (or a different notification) to entity 1422 to notify entity 1422 of event 1424. Notification 1471 can be an electronic message sent to one or more mobile phones.

Accordingly, aspects of the invention can notify an entity about events potentially impacting places and/or people. In one aspect, appropriate parties are notified of events occurring in an entity's current or probable future locations to increase situational awareness.

Figure 15:
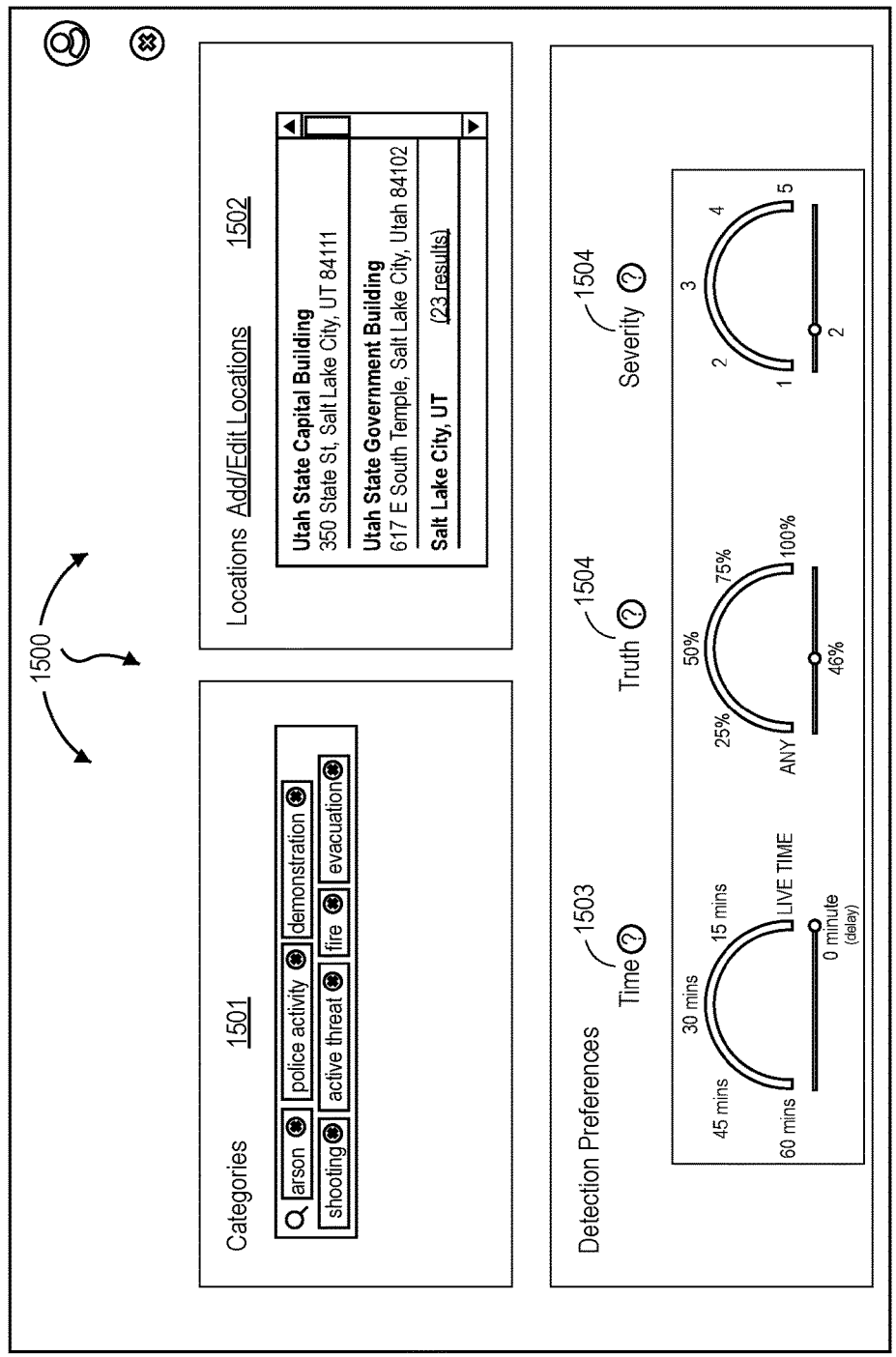
FIG. 15 depicts an example user interface that facilitates selecting event notification preferences.

FIG. 15 depicts an example user interface 1500 that facilitates selecting event notification preferences. User interface 1500 is one possible representation of user interface 1111. As depicted, user interface 1500 includes category controls 1501, locations controls 1502, time control 1503, truth control 1504, and severity control 1505. In general, an entity can manipulate controls in user interface 1500 to indicate event notification preferences. An entity can manipulate controls category controls 1501 to indicate a preference for being notified of different categories of events. An entity can manipulate location controls 1502 to indicate a preference for being notified of events at specified locations. As depicted an entity has indicated interest in various buildings in the Salt Lake City, Utah area.

An entity can manipulate time control 1503 to indicate a preference for being notified of events within a specified time frame after event occurrence, including "live time" or essentially at "moment zero". An entity can manipulate truth control 1504 to indicate a preference for being notified of events with at least a requisite truthfulness ranging from any truthfulness to 100% truthfulness. An entity can manipulate severity control 1505 to indicate a preference for being notified of events with at least a requisite severity ranging from severity 1 (less severe) to severity 5 (more severe).

Preferences selected through user interface 1500 can be stored in an event preferences database, such as, for example, event preferences database 1109. Further, when a entity is notified of an event, the entity may take some action in response to the notification, such as, dismissing the event, following further evolution of the event, etc. Entity action can be used as feedback to provide suggestions to the entity. For example, if an entity repeatedly dismisses accident events, the system may suggest that the entity remove "accident" as an event notification category.

Event Impact

In one aspect, components facilitating impact prediction and relevant entity notification are integrated with data ingestion modules 101 and an event detection infrastructure 103. An impact prediction module can predict impacts (e.g., disruptions) likely to be caused by an event. The impact prediction module can maintain an event history database of prior events and corresponding impacts. As new events are detected, the impact prediction module can refer to the event history database and compare the new events to prior events.

The impact prediction module can formulate predicted impacts of new events based on impacts of prior similar events. Predicted impacts can be on specified types of entities in an impacted area. Specified entities can include hospitals, blood banks, delivery services, etc. Impacted areas can include a geographic region within a specified distance of an event, a direction of travel on a roadway, a specific entity (e.g, a specialty medical facility), etc.

The impact prediction module can send predicted impacts, including impact types and areas, to an impact notification module. The impact notification module can refer to an entity database that stores entity types and entity locations. The impact notification module can compare impact types and impact areas to entity types and entity locations to identify entities likely to be affected by one or more predicted impacts of an event. The impact notification module can notify the identified entities that they are likely to be affected by one or more predicted impacts of an event.

Entities notified of an event may or may not be notified of a likely impact of the event. Similarly, entities notified of a likely impact of an event may or may not be notified of the event. For example, a news station may be notified of accident but not notified of potential traffic congestion caused by the accident. On the other hand, a hospital may not be notified of a shooting event but may be notified to expect multiple victims injured during the shooting.

Figure 16:
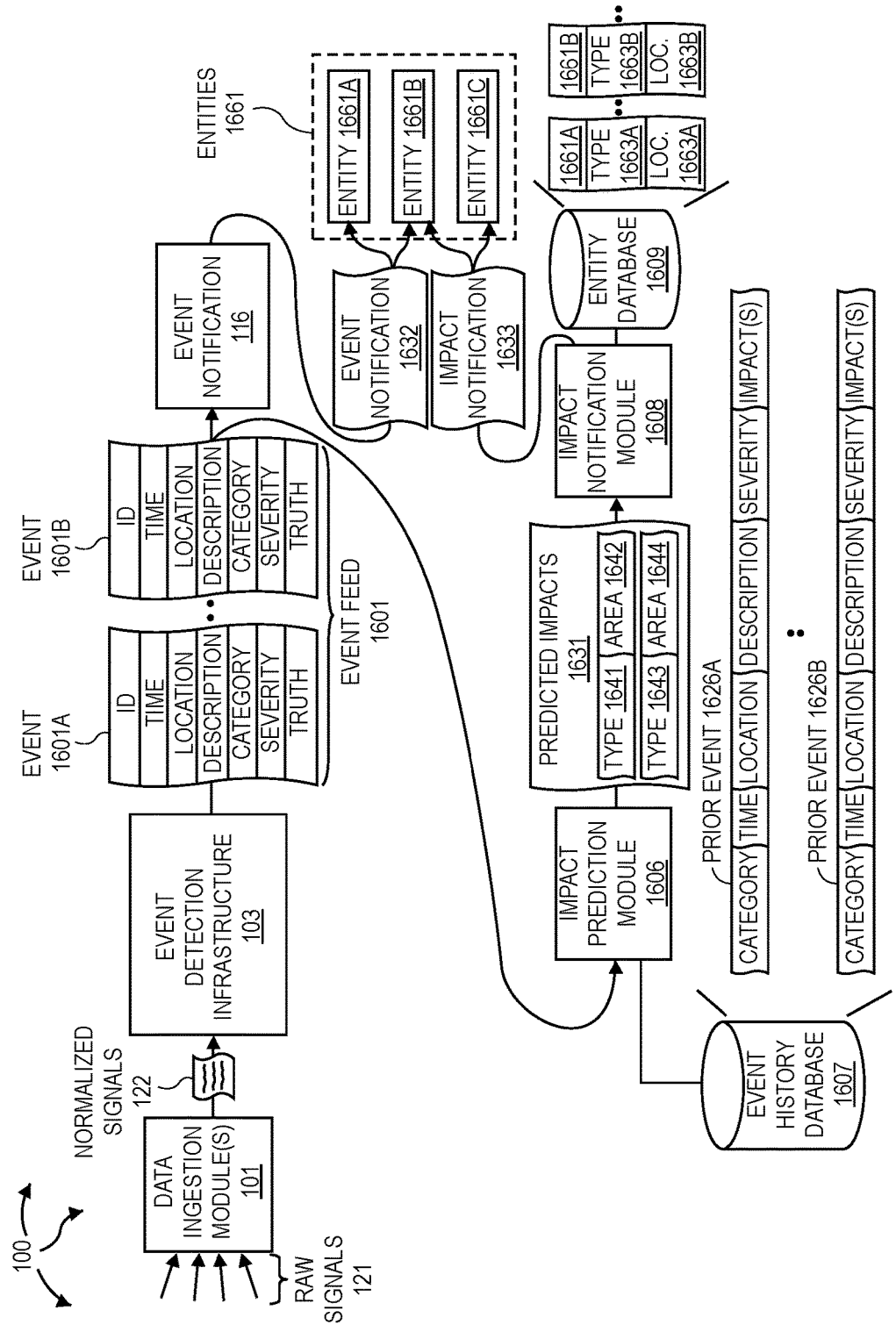
FIG. 16 illustrates a computer architecture that facilitates predicting event impact and notifying relevant entities.

FIG. 16 illustrates a computer architecture that facilitates predicting event impact and notifying relevant entities. As depicted, event detection infrastructure 103 generates event feed 1601, including events 1601A, 1601B, etc. Each event can include an event ID, a time, a location, a description, a category or categories (context), a severity, and a truthfulness As described, detected events can be of interest (or relevant) to entities, such as, for example, first responders, hospitals, blood banks, delivery services, media outlets, government entities, government agencies, etc. based on one or more of an event ID, an event time, an event location, an event category, an event severity, and an event description. Event detection infrastructure 103 can sent event feed 1601 to event notification 116 and to impact prediction module 1606. Event notification 116 can notify one or more entities 1661 of relevant events in event feed 1601 using described mechanisms.

Impact prediction module 1606 is configured to predict disruptions likely to be caused by an event. Impact prediction module 1606 can maintain event history database 1607 of prior events and corresponding impacts. Per event, for example, prior events 1626A and 1626B, event history database 1607 can store event category, event time, event location, event description, event severity, and impact(s).

As new events are detected, impact prediction module 1606 can refer to event history database 1607 and compare characteristics of the new events to characteristics of prior events. Impact prediction module 1606 can formulate predicted impacts of new events based on impacts of prior similar events. Predicted impacts can be on specified types of entities in an impacted area. Specified entities can include hospitals, blood banks, delivery services, etc. Impacted areas can include a geographic region within a specified distance of an event, a direction of travel on a roadway, a specific entity (e.g., a specialty medical facility), etc. Geographic features of a location such as, is the location in a flood plane, is the location historically subject to wildfires, is the location on a fault line, etc. can also be considered.

Figure 17:
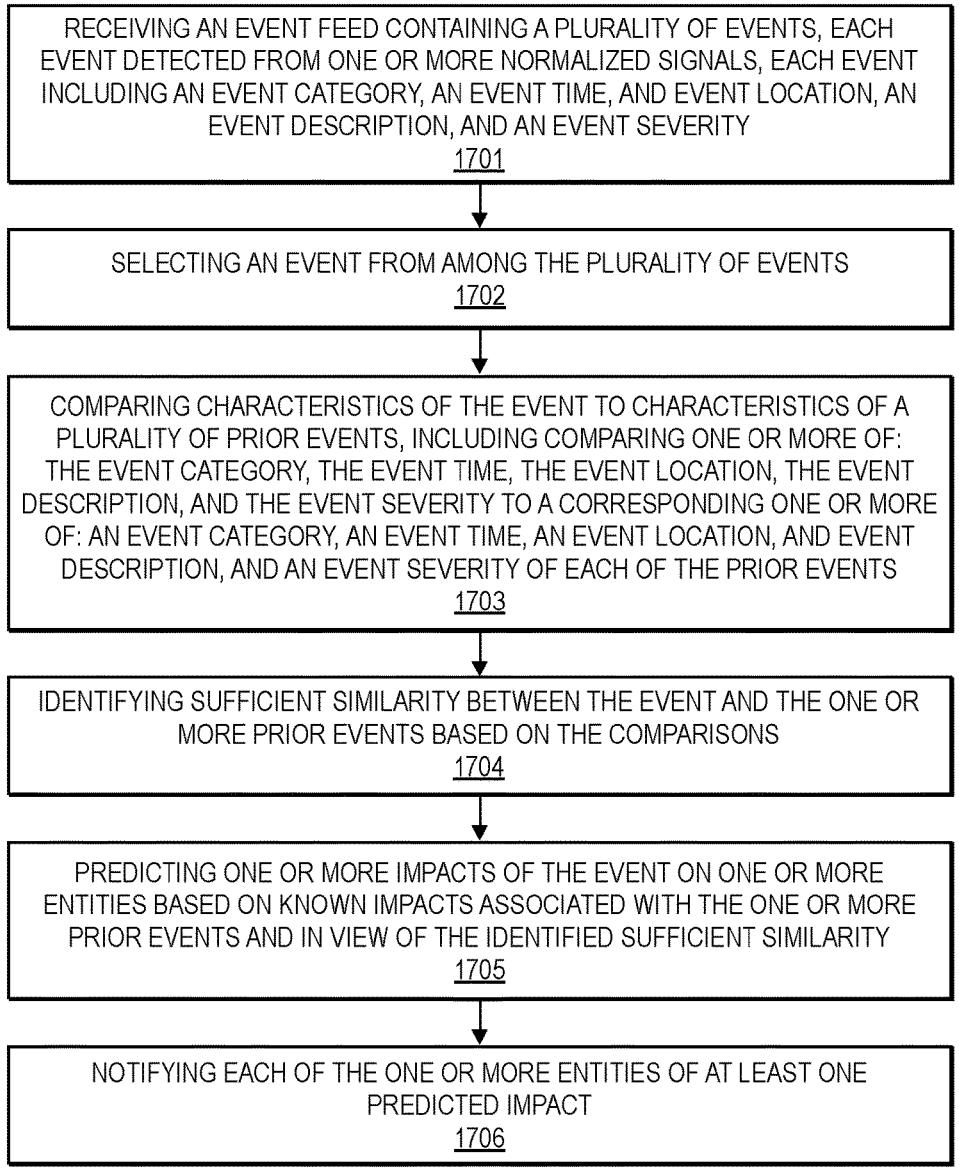
FIG. 17 illustrates a flow chart of an example method for predicting event impact and notifying relevant entities.

FIG. 17 illustrates a flow chart of an example method 1700 for predicting event impact and notifying relevant entities. Method 1700 will be described with respect to the components and data depicted in FIG. 15.

Method 1700 includes receiving an event feed containing a plurality of events, each event detected from one or more normalized signals, each event including an event category, an event time, an event location, an event description, and an event severity (1701). For example, impact prediction module 1606 can receive event feed 1601. Method 1700 includes selecting an event from among the plurality of events (1702). For example, impact prediction module 1606 can select event 1601A from event fees 1601.

Method 1700 includes comparing characteristics of the event to characteristics of a plurality of prior events, including comparing one or more of: the event category, the event time, the event location, the event description, and the event severity to a corresponding one or more of: an event category, an event time, an event location, an event description, and an event severity of each of the prior events (1703). For example, impact prediction module 1606 can compare characteristics of event 1601A to characteristics of prior events 1626A, 1626B, etc. More specifically, impact prediction module 1606 can compare time, category or categories, location, description, and severity included in event 1601A to time, category or categories, location, description, and severity included in prior events 1606A, 1606B, etc.

Method 1700 includes identifying sufficient similarity between the event and one or more prior events based on the comparisons (1704). For example, impact prediction module 1606 can identify sufficient similarity between characteristics of event 1601A and characteristics of prior event 1626B.

Method 1700 includes predicting one or more impacts of the event on one more entities based on known impacts associated with the one or more prior events and in view of the identified sufficient similarity (1705). For example, impact prediction module 1606 can predict that event 1601A is likely to cause impacts similar to prior event 1626B. The prediction can be based on known impacts associated with prior event 1626B and in view of the similarities between characteristics of event 1601A and characteristics of prior event 1626B. For example, a multi car accident with multiple injuries and multiple fatalities at a particular mile marker on a highway during rush hour is likely to cause impacts similar to impacts caused by prior multi car accidents with multiple injuries and multiple fatalities near the same mile marker on the highway during rush hour.

A predicted impact can be of a specified impact type and can impact a specified location or area. For example, impact prediction module 1606 can formulate predicted impacts 1631 of event 1601A, including impact type 1641/impact area 1642, impact type 1643/impact area 1644, etc. An event can cause multiple impact types in multiple impact areas. For example, mass shooting can impact one or more hospitals and one more blood banks. The one or more hospitals and one or more blood banks may be in different locations.

In one aspect, time adjustments or location adjustments are made to event data from event 1601A relative to event data from prior events 1626A, 1662B, etc. Impact prediction module 1606 extrapolates, predicts, or accesses any uncertainty in event data from prior events 1626A, 1662B, etc. relative to event data in event 1601A. Impact prediction module 1606 extrapolates predicted impacts 1631 based on the uncertainty. Accounting for uncertainty, impact prediction module 1606 can compensate for differences in event data.

For example, if event 1601A is similar to event 1626A but the locations of event 1601A and 1662A different by half a mile, impact prediction module 1606 can consider the difference in location when deriving predicted impacts 1631. Similarly, if event 1601A is similar to event 1626B but happened an hour earlier (or later) in the day, impact prediction module 1606 can consider the difference time of day when deriving predicted impacts 1631. Impact prediction module 1606 can give similar consideration to day of week, holidays, etc. For example, an event that happens on a weekend or holiday can have a different impact than a prior event that happened on a weekday or vice versa.

Method 1700 includes notifying each of the one or more entities of at least one predicted impact (1706). For example, impact prediction module 1606 can send predicted impacts 1631 to impact notification module 1608. Impact notification module 1608 can formulate impact notification(s) 1633. Impact notification module 1608 can send impact notification(s) 1633 to entities 1661B and 1661C. Impact notification 1633 can notify entities 1661B and 1661C of predicted impacts 1631, including impact type 1641/impact area 1642, impact type 1643/impact area 1644, etc.

Entity database 1609 stores entity type and entity location per entity. For example, entity database 1609 stores type 1662A and location 1663A for entity 1661A, stores type 1662B and location 1663B for entity 1661B, etc. Entity location may be dynamic if an entity is mobile, such as, for example, a delivery truck.

Impact notification module 1608 can refer to an entity database 1609. Impact notification module 1608 can compare impact types and impact areas to entity types and entity locations to identify entities likely to be affected by one or more predicted impacts of an event. For example, impact notification module can compare impact type 1641/area 1642 to type 1662A/location 1662B, to type 1662B/location 1663B, etc. Similarly, impact notification module 1608 can compare impact type 1643/area 1644 to type 1662A/location 1662B, to type 1662B/location 1663B, etc. Based on the comparisons, impact notification module 1608 can identify entities 1661B and 1661C as being impacted by event 1601A.

Concurrently, event notification 116 can send event notification 1632 to entities 1661A and 1661B to notify entities 1661A and 1461B of event 1601A. As such, entity 1661A is notified of event 1601A but not predicted impacts of event 1601A. Entity 1661B is notified of both event 1401A and predicted impacts of event 1401A. Entity 1661C is notified of event 1601A but is notified of predicted impacts of event 1601A.

In one aspect, entities register to receive predicted impacts. Predicted impacts can be included in a user interface similar to user interface 1111 or 1500. Preferences for predicted impact notifications can be stored in preferences database 1109 or another similar database. Impact identification module 1606 and/or impact notification module 1608 can filter predicted impacts based on entity preferences (similar to event identification module 1118 filtering events based on entity preferences). In some aspects, the functionality of impact prediction module 1606 and/or impact notification module 1608 are integrated into event notification 116 or vice versa.

Event 1601A can also be stored as a prior event in event history database 1607 along with predicted impacts 1631. Impact prediction module 1606 can use event 1601A and predicted impacts 163 when predicting impacts of other events detected after event 1601A.

Aspects of the invention predict impacts (e.g., disruptions) caused by events and notify relevant entities of predicted impacts (e.g., entities likely to be disrupted by predicted impacts). Timely notification of predicted impacts allows entities to better prepare for and/or take measures to address the predicted impacts so that the entities can respond to an event more efficiently and effectively.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
receiving an event feed containing a plurality of events, each event detected from one or more Time, Location, Context (TLC) normalized signals derived from one or more raw signals, each event including (1) an event location, (2) an event category, (3) an event truthfulness, (4) an event severity, and (5) an event time, the event truthfulness comprising an indication of how likely the event is a valid event;
accessing entity notification preferences defining events relevant to an entity;
identifying from within the entity notification preferences: category preferences, location preferences, time preferences, and truth preferences, wherein the time preferences define that the entity desires to be notified of events with respective event times indicating that the event occurred within a defined time period;
for an event in the event feed, comparing characteristics of the event to the entity event preferences, including:
comparing the event time to the time preferences;
comparing the event location to the location preferences;
comparing the event category to the category preferences; and
comparing the event truthfulness to the truth preferences;
determining that the event satisfies each of the entity event preferences based on the comparisons;
based on determining that the event satisfies each of the entity event preferences, notifying an electronic device of the event;
comparing characteristics of the event to characteristics of a plurality prior events;
identifying sufficient similarity between the event and one or more prior events from the plurality of prior events;
predicting an impact of the event based on impacts associated with the one or more prior events;
creating a second notification indicative of the predicted impacts; and
sending the second notification to the electronic device.

2. The method of claim 1, wherein the time preferences further define the entity's desire to be notified of events detected in live time.

3. The method of claim 1, wherein the time preferences define the entity's desire to be notified of events that occurred within a specific amount of time prior to a present time.

4. The method of claim 3, wherein the specified time period is between 1 minute and 60 minutes since a present time.

5. The method of claim 1, further comprising:
accessing location data corresponding to the entity;
determining a current location of the entity from the location data; and
wherein comparing the event location to the location preferences comprises comparing the event location to the current location of the entity.

6. The method of claim 5, wherein notifying the electronic device comprises notifying another entity.

7. The method of claim 1, further comprising:
accessing location data corresponding to the entity;
determining a probable future location of the entity from the location data; and
wherein comparing the event location to the location preferences comprises comparing the event location to the probable future location of the entity.

8. The method of claim 7, wherein notifying the electronic device comprises notifying another entity.

9. A computer system comprising:
a processor;
system memory coupled to the processor and storing instructions configured to cause the processor to:
receive an event feed containing a plurality of events, each event detected from one or more Time, Location, Context (TLC) normalized signals derived from one or more raw signals, each event including an event location, an event category, an event truthfulness, an event severity, and an event time;
access entity notification preferences defining events relevant to an entity;
determining from the entity notification preferences a category preference, a location preference, a truthfulness preference, a severity preference, a time preference, the time preference defining that the entity desires to be notified of events with respective event times indicating that the event occurred within a defined time period;
for an event in the event feed, compare characteristics of the event to the entity event preferences, including:
compare the event location to the location preferences in view of the distance preferences;
compare the event category to the category preferences;
compare the event truthfulness to the truth preferences; and
compare the event severity to the severity preferences;
determine that the event satisfies each of the entity event preferences based on the comparisons;
comparing characteristics of the event to characteristics of a plurality prior events;
identifying sufficient similarity between the event and one or more prior events from the plurality of prior events;
predicting an impact of the event based on impacts associated with the one or more prior events; and
based on determining that the event satisfies each of the entity event preferences and predicting the impact of the event from one or more prior events, notify an electronic device of the event and the predicted impact in compliance with the time preferences.

10. The computer system of claim 9, wherein the time preferences define notifying the entity in live time; and wherein instructions configured to cause the processor to notify an electronic device comprise instructions configured to cause the processor to notify the electronic device in live time.

11. The computer system of claim 9, further comprising instructions configured to cause the processor to, prior to notifying the electronic device, wait for a time delay defined in the time preferences.

12. The computer system of claim 11, wherein the time delay is between 1 minute and 60 minutes.

13. The computer system of claim 9, further comprising instructions configured to cause the processor to:
   access location data corresponding to the entity; and
   determine a current location of the entity from the location data; and
   wherein instructions configured to cause the processor to compare the event location to the location preferences in view of the distance preferences comprises instructions configured to cause the processor to compare the event location to the current location of the entity.

14. The computer system of claim 13, wherein instructions configured to cause the processor to notify an electronic device comprises instructions configured to cause the processor to notify another entity.

15. The computer system of claim 9, further comprising instructions configured to cause the processor to:
   access location data corresponding to the entity; and
   determine a probable future location of the entity from the location data; and
   wherein instructions configured to cause the processor to compare the event location to the location preferences in view of the distance preferences comprise instructions configured to cause the processor to compare the event location to the probable future location of the entity.

16. The computer system of claim 15, wherein instructions configured to cause the processor to notify an electronic device comprise instructions configured to cause the processor to notify another entity.

* * * * *